United States Patent
Sprague et al.

(10) Patent No.: US 8,792,608 B2
(45) Date of Patent: Jul. 29, 2014

(54) BWR JET PUMP INLET-MIXER MAIN WEDGE WITH INSERTS

(75) Inventors: Robin D. Sprague, Wilmington, NC (US); Michael S. DeFilippis, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 798 days.

(21) Appl. No.: 12/940,519

(22) Filed: Nov. 5, 2010

(65) Prior Publication Data

US 2012/0112036 A1    May 10, 2012

(51) Int. Cl.
| | |
|---|---|
| *G21C 15/00* | (2006.01) |
| *G21C 19/28* | (2006.01) |
| *G21C 15/25* | (2006.01) |
| *F16B 13/04* | (2006.01) |
| *F16B 19/00* | (2006.01) |
| *F16B 13/06* | (2006.01) |
| *E21D 21/00* | (2006.01) |

(52) U.S. Cl.
CPC ............ *G21C 15/25* (2013.01); *Y02E 30/40* (2013.01); *F16B 13/068* (2013.01); *E21D 21/008* (2013.01); *Y10S 411/954* (2013.01)
USPC ............ 376/372; 411/26; 411/75; 411/78; 411/354; 411/954

(58) Field of Classification Search
CPC ....................................................... G21C 15/25
USPC ................. 376/372; 411/954, 354, 78, 75, 26
See application file for complete search history.

(56) References Cited

U.S. PATENT DOCUMENTS 3,655,210 A * 4/1972 Farnam et al. ............... 277/592
3,739,675 A * 6/1973 Duckett et al. ............... 83/659

(Continued)

FOREIGN PATENT DOCUMENTS

| EP | 2237284 A2 | 10/2010 |
|---|---|---|
| JP | 62-141303 | 6/1987 |

(Continued)

OTHER PUBLICATIONS

Allan et al., Behavior of Bolted Joints With Oversize or Slotted Holes, Fritz Engineering Laboratory Report No. 318.3, Department of Civil Engineering, Lehigh University, Aug. 1967.*

(Continued)

*Primary Examiner* — Frank J McGue
(74) *Attorney, Agent, or Firm* — Harness, Dickey & Pierce, PLC

(57) ABSTRACT

Disclosed are various wedges that may be used in a restrainer bracket of a jet pump assembly. The jet pump assembly may include a restrainer bracket having an upper bracket and a lower bracket connected to an inlet mixer. A wedge may be provided between the upper bracket and the lower bracket and a wedge rod may pass through a slotted hole of the wedge. Ends of the wedge rod may be attached to the upper and lower brackets. The restrainer bracket may further include a yolk-like member which surrounds the inlet mixer and is connected to a riser pipe. The wedge may include an inclined surface which is configured to engage with a restrainer bracket pad of the yolk-like member. The wedges may further include inner curved surfaces which contact the wedge rod and the inner curved surfaces may be part of an insert that may be inserted in the wedge.

13 Claims, 26 Drawing Sheets

(56) References Cited

U.S. PATENT DOCUMENTS

| | | | |
|---|---|---|---|
| 3,758,032 A * | 9/1973 | Varga et al. | 238/338 |
| 3,811,689 A * | 5/1974 | Farnam | 277/637 |
| 3,989,323 A * | 11/1976 | Lambert | 384/434 |
| 5,947,529 A * | 9/1999 | Jensen | 285/123.6 |
| 6,195,892 B1 * | 3/2001 | Weems et al. | 29/890.031 |
| 6,320,923 B2 | 11/2001 | Wivagg et al. | |
| 6,322,087 B1 * | 11/2001 | Swensen et al. | 277/626 |
| 6,438,192 B1 | 8/2002 | Erbes et al. | |
| 6,788,756 B2 * | 9/2004 | Erbes | 376/372 |
| 7,023,949 B2 | 4/2006 | Wivagg | |
| 2010/0242279 A1 | 9/2010 | Sprague et al. | |
| 2011/0280360 A1 * | 11/2011 | Flanigan et al. | 376/372 |
| 2012/0018612 A1 | 1/2012 | Defilippis | |

FOREIGN PATENT DOCUMENTS

| | | |
|---|---|---|
| JP | 01-158207 | 6/1989 |
| JP | 11-325022 | 11/1999 |
| JP | 2002-221589 A | 8/2002 |
| JP | 2010-174966 A | 8/2010 |
| JP | 2010237207 A | 10/2010 |

OTHER PUBLICATIONS

Mercer Gasket & Shim, "Spiral Wound Gaskets", web page http://www.mercergasket.com/spiral_wound_gaskets.htm, 2006.*

Japanese Office Action dated Feb. 4, 2014 for the corresponding JP Application No. 2011-242152.

* cited by examiner

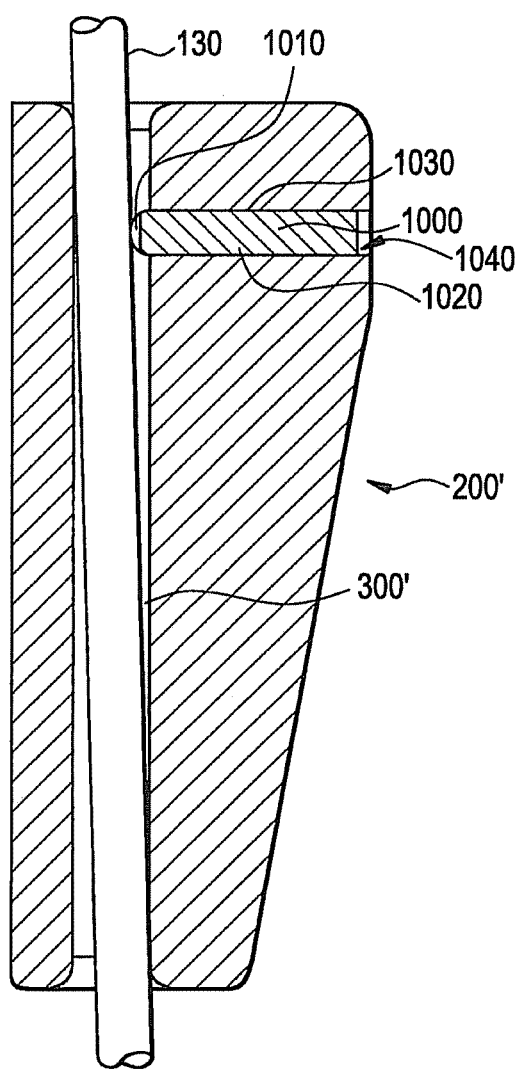

BWR JET PUMP INLET-MIXER MAIN WEDGE WITH INSERTS

BACKGROUND

1. Field

Example embodiments relate to a restrainer bracket including a wedge and in particular a restrainer bracket for a jet pump assembly.

2. Description of the Related Art

Conventional boiling water reactors include a reactor pressure vessel (RPV) which surrounds a core shroud. The core shroud, in turn, surrounds a reactor core. Generally, each of the core shroud and the reactor pressure vessel are cylindrically shaped such that an outer diameter of the core shroud is less than an inner diameter of the reactor pressure vessel. Between a reactor pressure vessel wall and a core shroud wall is an annular space in which jet pump assemblies are typically located.

FIG. 1 illustrates a conventional jet pump assembly 25 located in the aforementioned annulus. As illustrated in FIG. 1, an inlet nozzle 10 extending through a sidewall 15 of the RPV 20, is coupled to the jet jump assembly 25. The jet pump assembly 25 includes a riser pipe 30 that extends between the shroud 35 and the sidewall 15 of the RPV 20. The riser pipe 30 is coupled to two jet pumps 35A and 35B by a transition assembly 40. Each jet pump 35A and 35B includes a jet pump nozzle 42, a suction inlet 45, an inlet mixer, and a diffuser 55. For example, the first jet pump 35A includes a first inlet mixer 50A and the second jet pump 35B includes second inlet mixer 50B. The jet pump nozzles 42 are positioned in the suction inlets 45 that are located at a first end of inlet mixers 50A and 50B. The diffusers 55, are coupled to a second end of inlet mixers 50A and 50B by a slip joint 65. Typically, both of the inlet mixers 50A and 50B and the diffusers 55 are formed of multiple cylindrical sections. Circumferential welds 70 join the cylindrical sections together.

A support member (riser brace) 75 typically surrounds the riser pipe 30 and connects to the riser pipe 30 via a weld 80 which may span approximately 180 degrees around the circumference of the riser pipe 30. The inlet mixers 50A and 50B are secured to the riser pipe 30 via a restrainer bracket 100.

Referring to FIG. 2, the conventional restrainer bracket 100 includes a first yolk-like member 105 surrounding the inlet mixer 50A. Though not shown, a similar yolk-like member surrounds mixer 50B. Because the yolk-like member surrounding the mixer 50B may be substantially the same as the yolk-like member 105 surrounding mixer 50A, only the yolk-like member 105 and its associated components will be described.

As shown in FIG. 2, the yolk-like member 105 surrounds the inlet mixer 50A. Penetrating the yolk-like member 105 are at least two set screws 110 which press against the inlet mixer 50A. In FIG. 2, only one set screw 110 is shown. A main wedge 115 is typically provided between a restrainer bracket pad 145 of the yolk-like member 105 and the inlet mixer 50A. The main wedge 115 includes a circular hole 190 (see FIGS. 3, 4, and 5) through which a wedge rod 130 passes. The wedge rod 130 has a threaded top end 131 which connects to an upper support casting 120 and a threaded bottom end which connects to a lower support casting 125.

The upper support casting 120 is arranged above the yolk-like member 105. The upper support casting 120 includes two vertically oriented plates 121 and 122 welded to the inlet mixer 50A. The vertically oriented plates 121 and 122 may be separated from each other by a distance d1 and may be parallel to each other as shown in FIG. 2. The upper support casting 120 also includes a third beam 123 which connects the middle portions of the two vertically oriented plates 121 and 122. The upper support casting 120 also includes a fourth plate 124 near top portions of the vertically oriented plates 121 and 122. As shown in FIG. 2, the fourth plate 124 is connected to inside faces of the vertically oriented plates 121 and 122. The fourth plate 124 is oriented horizontally and includes a hole through which the threaded top end 131 of the wedge rod 130 passes. A top surface of the fourth plate 124 may act as a bearing surface to support a nut 135 which may be configured to engage the threads of the threaded top end 131 of the wedge rod 130.

The lower support casting 125 is arranged below the yolk-like member 105. The lower support casting 125 includes two vertically oriented plates 126 and 127 welded to the inlet mixer 50A. The vertically oriented plates 126 and 127 are separated from each other by a distance d2 and are parallel to each other as shown in FIG. 2. The lower support casting 125 also includes a seventh plate 128 near bottom portions of the vertically oriented plates 126 and 127. The seventh plate 128 is oriented horizontally and includes a hole through which the threaded bottom end of the wedge rod 130 passes. As shown in FIG. 2, the seventh plate 128 connects to inside faces of the vertically oriented plates 126 and 127. A bottom surface of the seventh plate 128 acts as a bearing surface to contact a nut 140 which may be configured to engage the threads of the threaded bottom end of the wedge rod 130.

As shown in FIGS. 3 and 4, the conventional main wedge 115 is comprised of three portions: a head 150, a neck 155, and a body 160. The head 150 resembles a relatively thick horizontal plate having rounded edges and corners. The body resembles a wedge having an inclined face 156 (see FIG. 3), which engages the restrainer bracket pad 145 of the restrainer bracket 100. Widths d3, d4, and d5 (see FIG. 2) of the head 150, the neck 155, and the body 160 may be smaller than the distance d1 separating the vertical plates 121 and 122 and the distance d2 separating the vertical plates 126 and 127.

As previously mentioned, a hole 190 passes through the main wedge 115. The hole 190 is circular and extends through the head 150, the neck 155, and the body 160. The diameter D2 of the hole 190 is slightly larger than the diameter D1 of the wedge rod 130 to accommodate the wedge rod 130.

In the conventional art, the hole 190 penetrates the head 150, the neck 155, and the body 160. At a top surface of the head 150, however, the hole is chamfered creating a sloped surface 192 to allow the wedge rod 130 to be easily inserted into the head 150. Likewise, at a bottom surface of the body 160 the hole 190 is chamfered creating another sloped surface 194.

In the conventional art, because the diameter D2 of the hole 190 of the wedge 115 is larger than the diameter D1 of the wedge rod 130, the wedge 115 is free to slide along the wedge rod 130.

FIG. 5 is a cross-section of the main wedge 115 of the conventional restrainer bracket 100 and FIG. 6 is a cross-section of the main wedge 115 with the wedge rod 130 in the hole 190. As shown in FIG. 6, the main wedge 115 may be slightly inclined with respect to the wedge rod 130. Therefore, corners A+ and B+ of the chamfered areas 192 and 194 of the head 150 and the body 160 may contact the wedge rod 130.

SUMMARY

Example embodiments relate to a restrainer bracket including a wedge and in particular a restrainer bracket for a jet pump assembly.

In accordance with example embodiments, a wedge may include a head, a neck, and a body. The head may include a first surface. The first surface may be substantially flat and the first surface may enclose a first slotted hole having a first length and a first height. The first slotted hole may engage a second surface, which may be a curved surface extending below the first surface and terminating in a second slotted hole having a second length and a second height. The neck may be arranged below and connected to the head. The body may be arranged below and connected to the neck. The body may include an inclined surface and a third surface. The third surface may be substantially flat and the third surface may enclose a third slotted hole having a third length and a third height. The third slotted hole may engage a fourth surface and the fourth surface may be a curved surface extending above the third surface and terminating in a fourth slotted hole having the second length and the second height. The second slotted hole may extend through the head, the neck, and the body and may terminate at the fourth slotted hole.

In accordance with example embodiments, a restrainer bracket may include an upper support casting, a lower support casting below the upper support casting, and a wedge between the upper support casting and the lower support casting. The wedge may include a main body having an inclined surface, a head on the main body, and a neck between the main body and the head, the main body, the neck, and the head may enclosing a first slotted hole having a first height and a first length passing there through. In example embodiments, the restrainer bracket may further include a rod having a first end connected to the upper support casting, a lower end connected to the lower support casting, and a main body passing through the slotted hole. In example embodiments, the main body may have a diameter smaller than the first slot height so that the wedge is free to slide on the rod. In example embodiments, the restrainer bracket may further include a bracket including a restrainer bracket pad configured to engage the inclined surface.

BRIEF DESCRIPTION OF THE DRAWINGS

Example embodiments of the present invention will be more clearly understood from the following detailed description taken in conjunction with the accompanying drawings.

FIG. 18 is a section view of a main wedge according to example embodiments;

DETAILED DESCRIPTION OF THE EXAMPLE EMBODIMENTS

Figure 1:
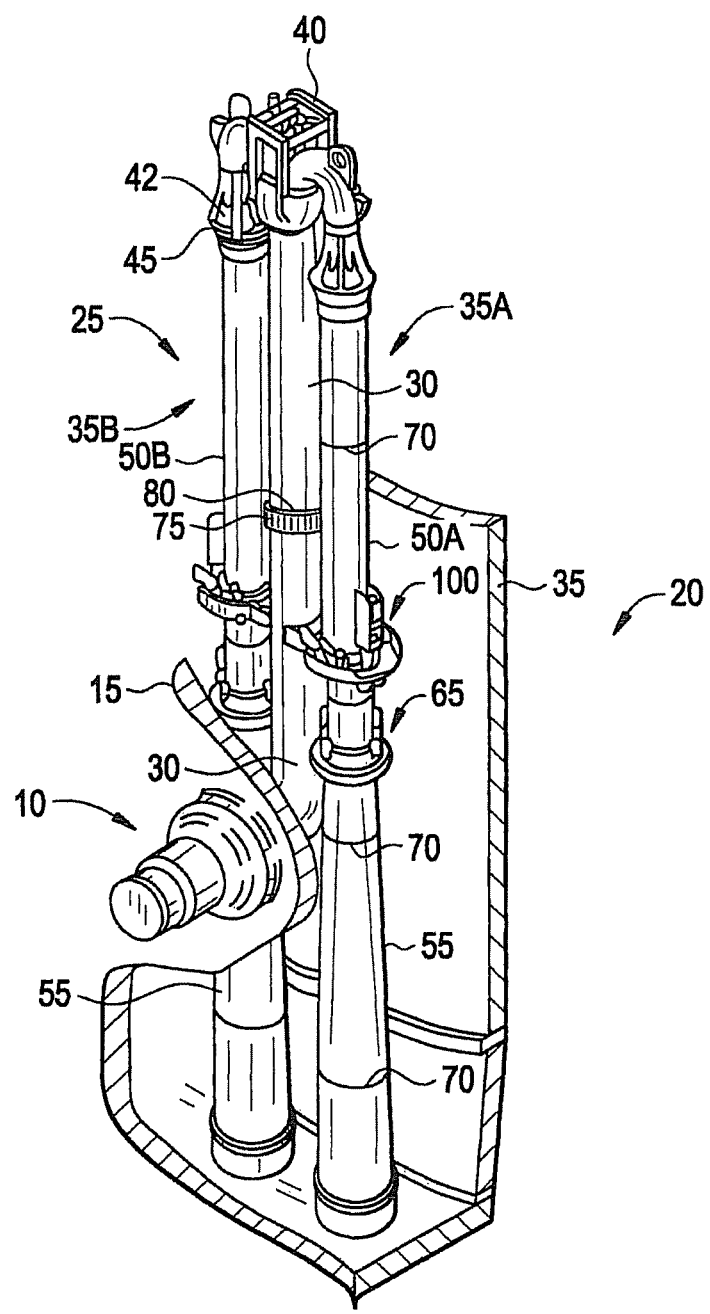
FIG. 1 is a view of a conventional jet pump assembly.

Example embodiments of the invention will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

Figure 2:
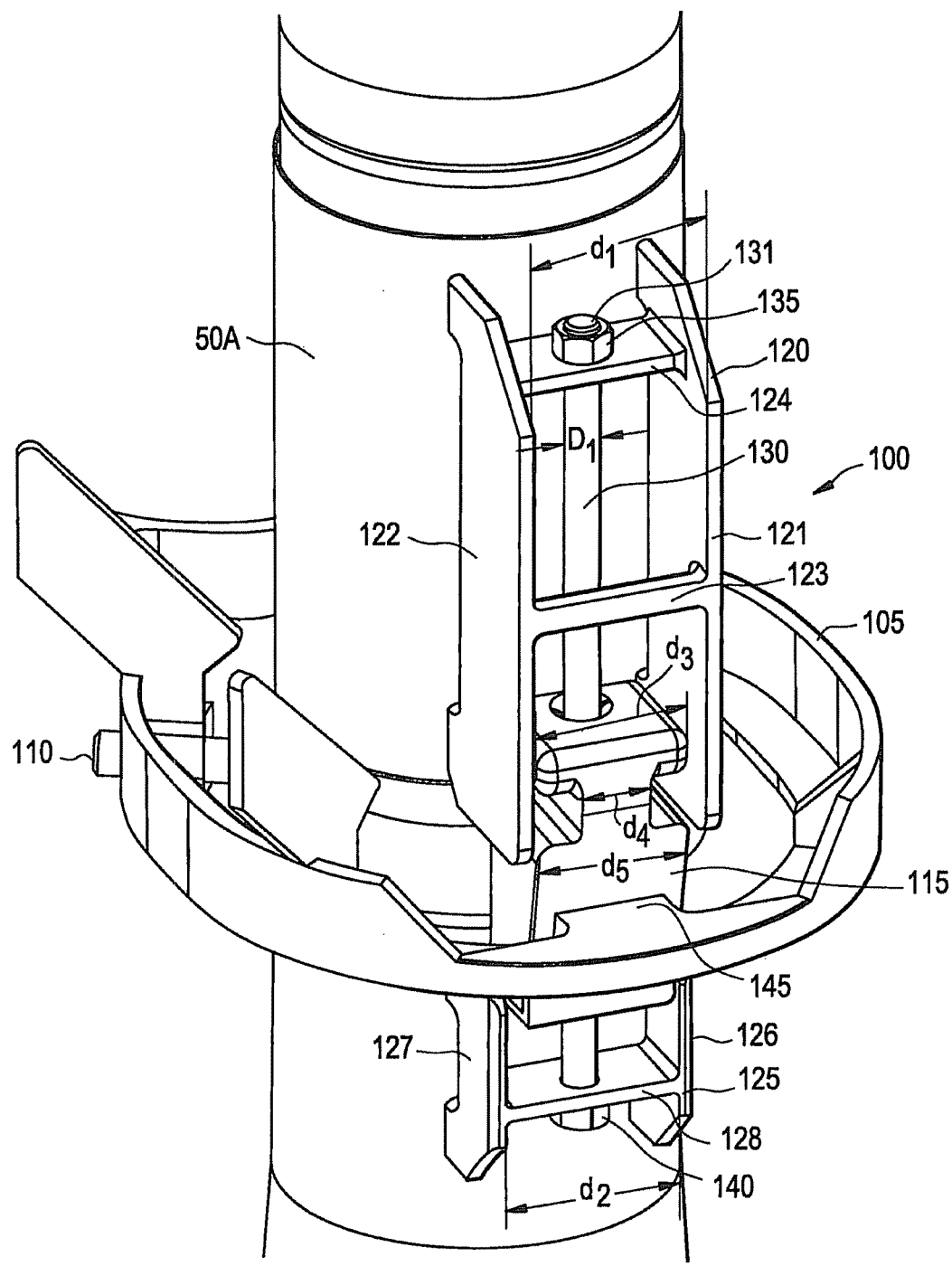
FIG. 2 is a view of a conventional restrainer bracket of a jet pump assembly.
Figure 3:
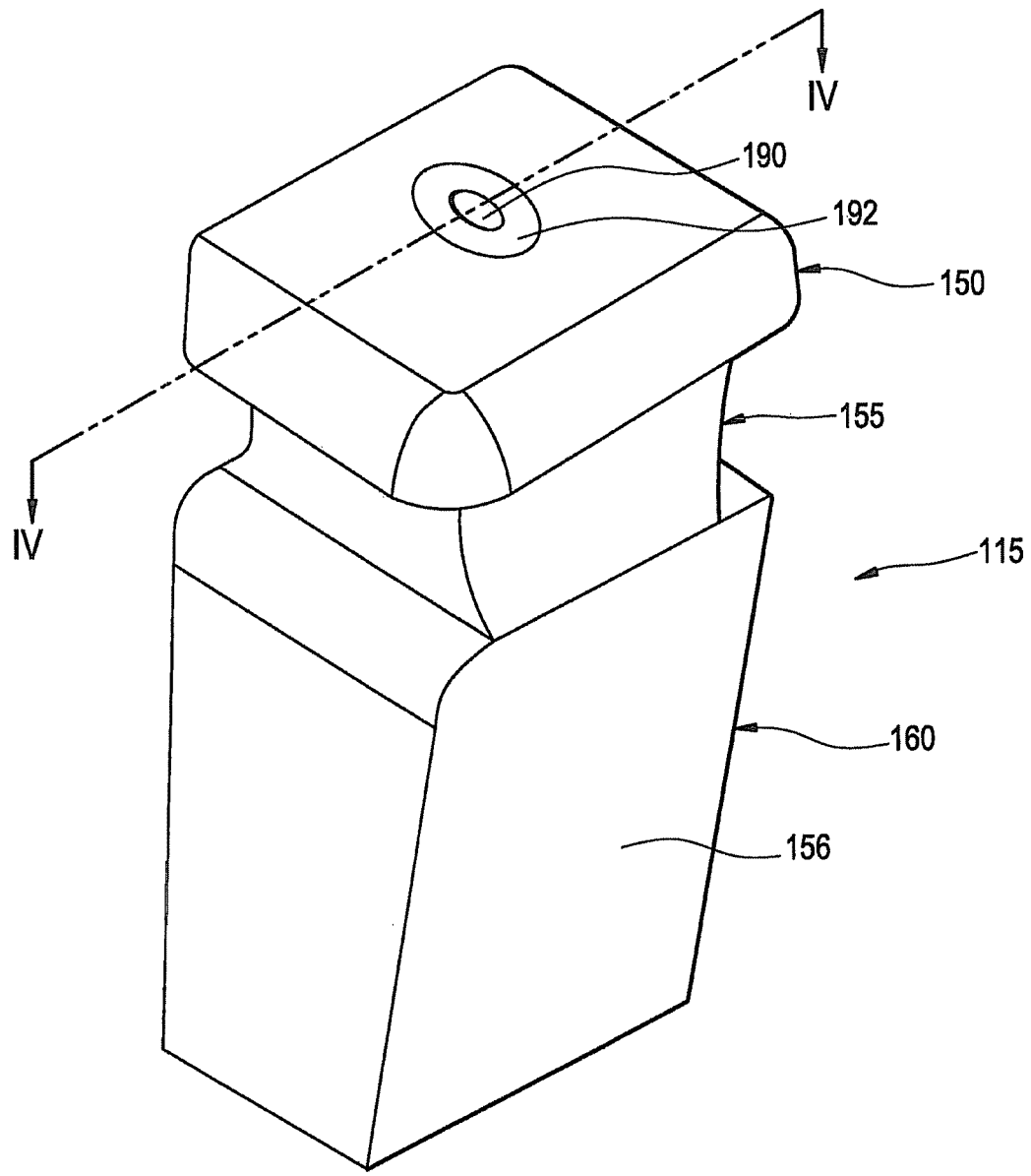
FIG. 3 is a section view of a main wedge of the conventional restrainer bracket.
Figure 4:
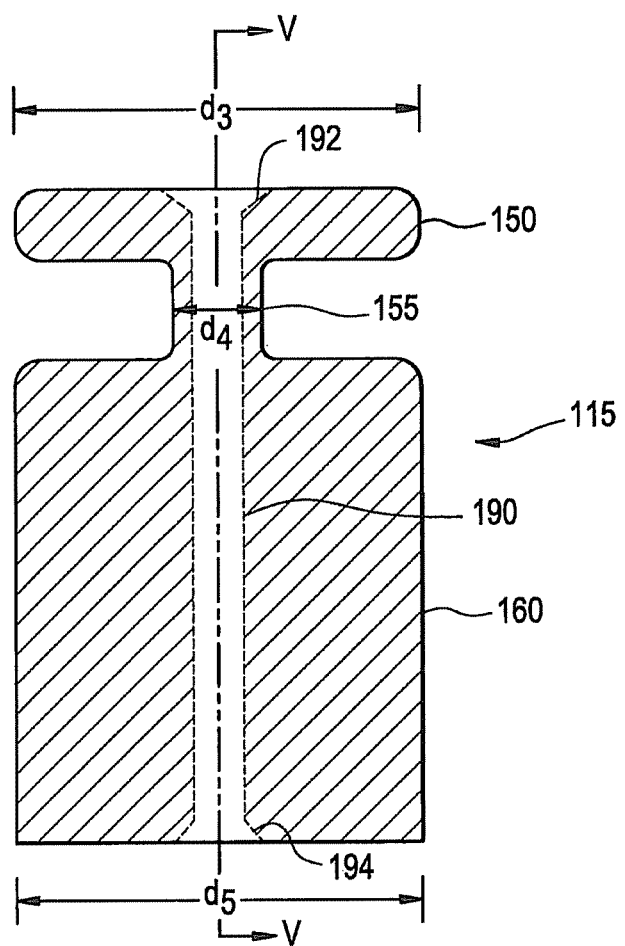
FIG. 4 is a front view of the main wedge of the conventional restrainer bracket.
Figure 5:
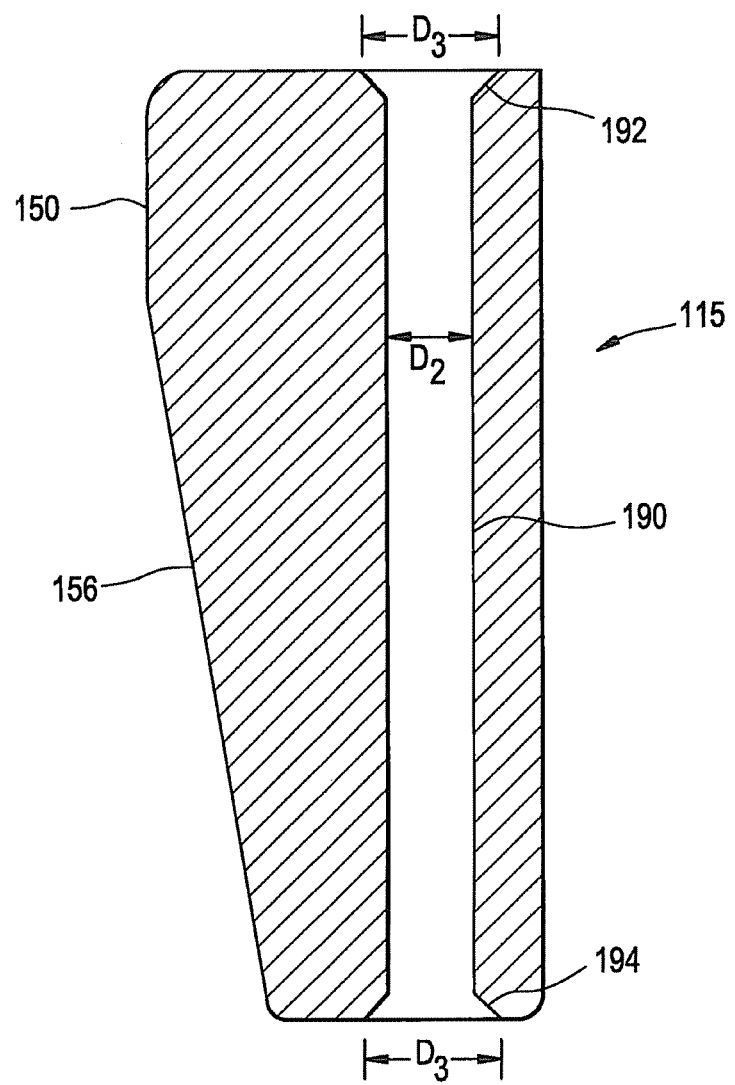
FIG. 5 is a section view of the main wedge of the conventional restrainer bracket.
Figure 6:
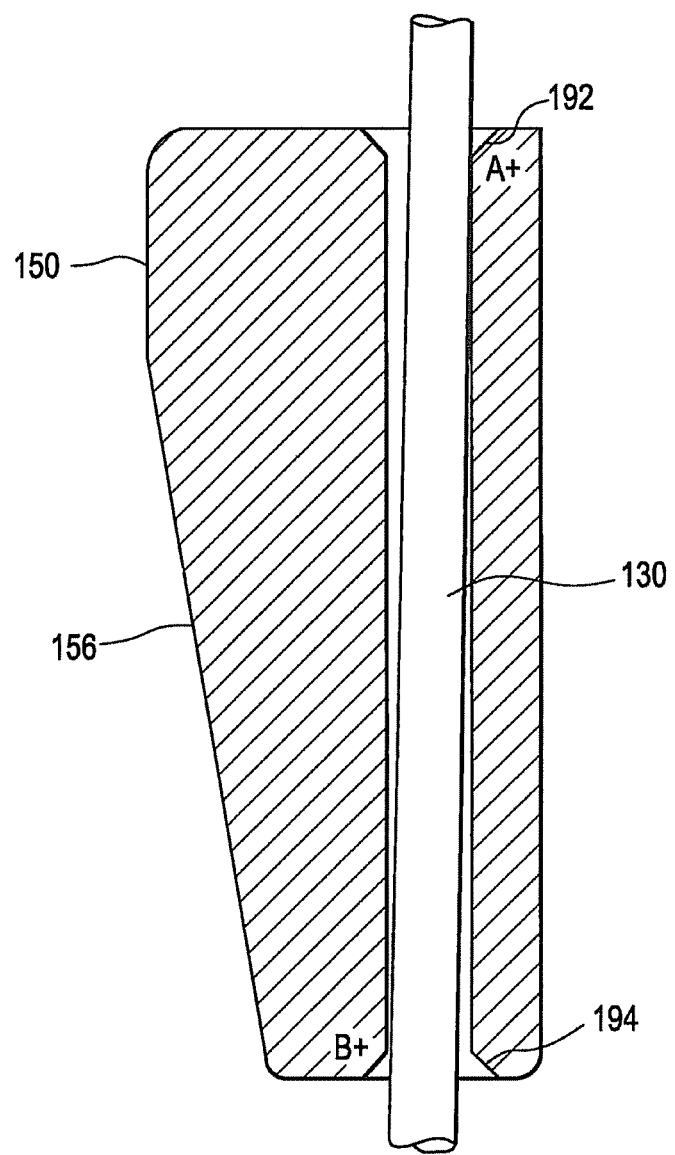
FIG. 6 is a section view of the main wedge of the conventional restrainer bracket with a wedge rod inserted therein.

As discussed above, a conventional riser pipe 30 of a jet pump assembly 25 is connected to inlet mixers 50A and 50B via restrainer brackets 100. As previously described, a restrainer bracket 100 includes a yolk like member 105, an upper bracket 120 and a lower bracket 125. As shown in FIG. 2 the upper bracket 120 and the lower bracket 125 are connected to an inlet mixer 50A via welding. The upper bracket 120 and the lower bracket 125 are also connected to each other via a wedge rod 130. As previously described, the restrainer bracket 100 also includes a main wedge 115, which is free to slide on the wedge rod 130 and has an inclined face 156 configured to contact a bracket pad 145 of a yolk member 105. The Applicants have discovered that the main wedge 115 and/or the wedge rod 130 of the restrainer bracket 100 are susceptible to wear. Therefore, the Applicants have designed a new wedge member, which may reduce wear to a main wedge and/or wedge rod.

Figure 7:
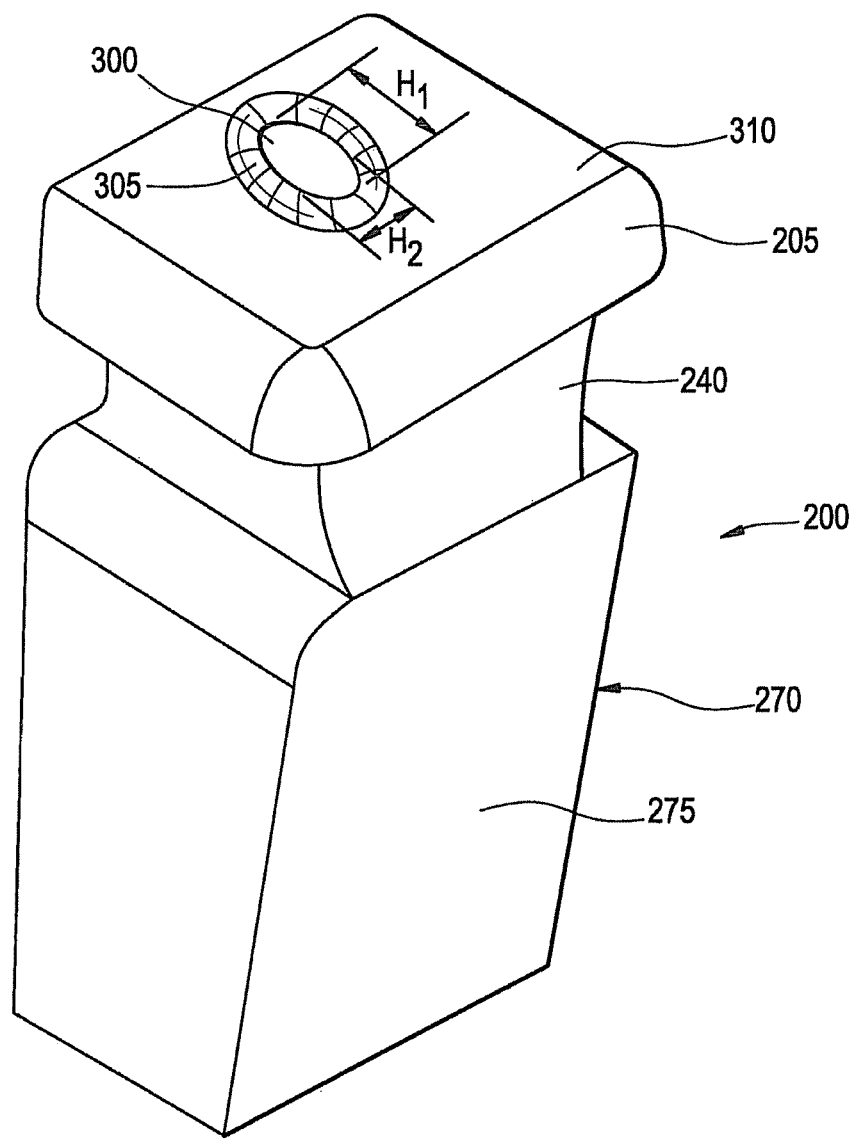
FIG. 7 is a view of a main wedge according to example embodiments.

FIG. 7 illustrates a main wedge 200 according example embodiments that may be used in a conventional restrainer bracket, for example, the restrainer bracket 100 illustrated in FIG. 2. The main wedge 200 according to example embodiments may include a head 205, a neck 240, and a body 270. The head 205 may resemble a flat plate having rounded edges and/or corners. However, the head is not limited to the founded edges and/or corners and may instead have relatively sharp edges and/or corners. The body 270 may resemble a wedge having an inclined surface 275. In example embodiments, the inclined surface 275 may be configured to interface with a conventional restrainer bracket pad, for example, the restrainer bracket pad 145 of the conventional yolk member 105. A hole 300 may penetrate the head 205, the neck 240 and the body 270. The external dimensions of the head 205, the neck 240, and the body 270 of the main wedge 200 according to example embodiments may be substantially similar to the dimensions of the head 150, the neck 155 and the body 160 of the conventional main wedge 115. However, the internal structure of the main wedge 200 according to example embodiments is significantly different from the internal structure of the conventional main wedge 115.

Figure 8:
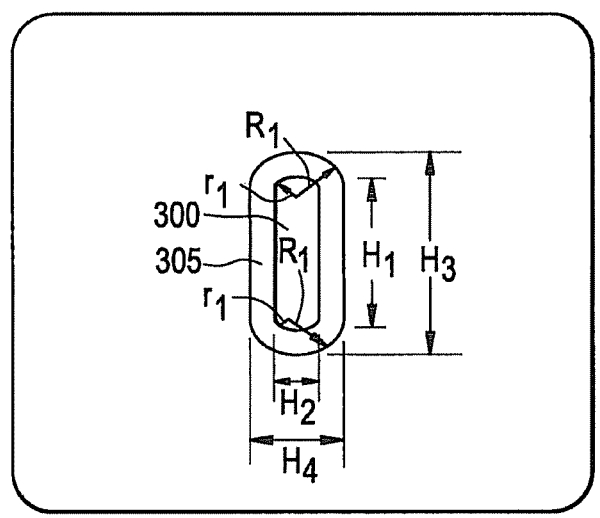
FIG. 8 is a top view of a main wedge according to example embodiments.

FIG. 8 is a plan view of the main wedge 200, which shows the hole 300. As is obvious from FIG. 8, the hole 300 penetrating the main wedge 200 is slotted. This aspect departs from the conventional main wedge 115 in that the conventional main wedge 115 has a circular hole 190 rather than a slotted hole. As shown in FIG. 8, the slotted hole 300 has a slot length of H1 and a slot height H2. In example embodiments, the slot length H1 is greater than the slot height H2. The ends of the slotted holes may be filleted to have a radius of r1. In example embodiments, the slot height H2 may be substantially equal to twice the fillet radius r1, however, example embodiments are not limited thereto as the slot height H2 may be larger than twice the fillet radius r1. In addition, the slot height H2 should be large enough to allow a wedge rod to pass therethrough thus allowing the main wedge 200 to freely slide on the wedge rod. For example, the slot height H2 should be larger than the diameter of the wedge rod D1.

As previously mentioned, in the conventional art, a wedge rod 130 passes through a circular hole 190 formed in the conventional wedge 115. However, in example embodiments, because the hole is slotted, side clearances between a wedge rod passing through the main wedge 200 and the main wedge 200 may be reduced. For example, the slot height H2 may be less than the diameter D2 of the circular hole passing through the conventional main wedge 115. Reducing the side clearances may reduce an amount of acceleration of the wedge 200 in the slot height H2 direction in the event the wedge 200 becomes excited and toggles back and forth. This mode of vibration may cause the wedge rod to wear. Therefore, reducing the acceleration of the wedge may reduce wedge rod wear.

Figure 9:
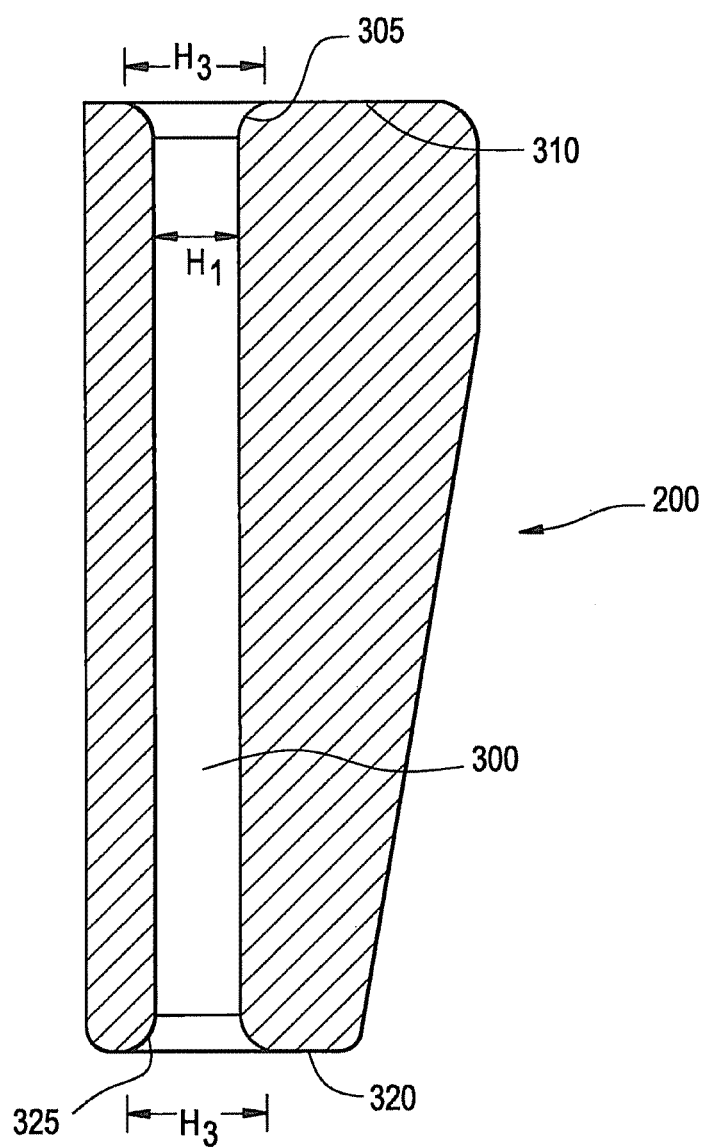
FIG. 9 is a section view of a main wedge according to example embodiments.

FIG. 9 is a cross-section of the main wedge 200 according to example embodiments. As shown in FIG. 9, the slotted hole 300 passes through the head 205, the neck, 240, and the body 270 of the main wedge 200. The head 205 includes a first surface 310 which is relatively flat. However, the head 205 also includes a second surface 305, which is a curved filleted surface that surrounds and defines the hole 300. The second surface 305 resembles a curved and slotted funnel. The top of the second surface 305 is incident with the first surface 310 of the head 205 and resembles a slotted circle having slot length H3 and a slot height H4 (see FIG. 8). The bottom of the second surface 305 defines the hole 300 and thus likewise resembles a slotted hole. For example, the bottom of the second surface 305 resembles a slotted circle having a slot length of H1 and a slot height of H2.

The body 270 of the main wedge 200 includes a third surface 320 which is relatively flat. However, the body 270 also includes a fourth surface 325, which is a curved filleted surface that surrounds and defines the hole 300. The fourth surface 325 resembles a slotted funnel. The bottom of the fourth surface 325 is incident with the third surface 320 of the body 270 and resembles a slotted circle that may have a slot length H3 and a slot height H4, however, example embodiments are not limited thereto. The top of the fourth surface 325 defines the hole 300 and thus likewise resembles a slotted hole. For example, the top of the fourth surface 325 resembles a slotted circle having a slot length of H1 and a slot height of H2.

Figure 10:
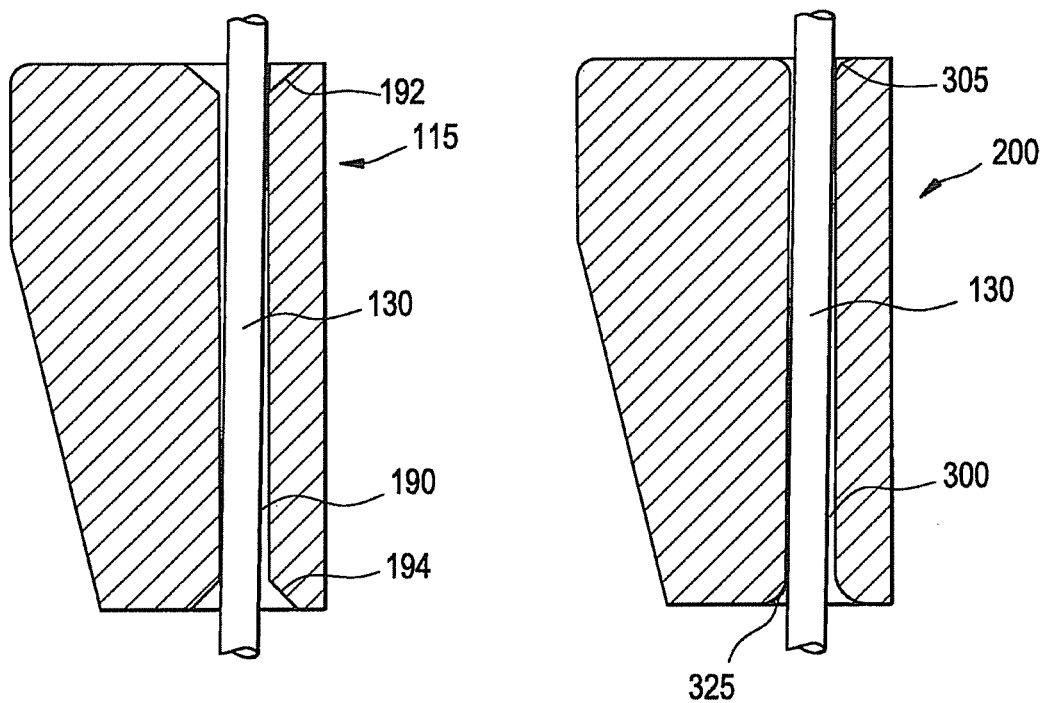
FIG. 10 is a side-by-side comparison of a conventional main wedge and a main wedge according to example embodiments.

FIG. 10 is a side-by-side comparison between the main wedge 200 of example embodiments and the conventional wedge 115. Each of the main wedge 200 and the conventional wedge 115 have a hole passing therethrough which accommodates a wedge rod 130. In the conventional art, the conventional wedge 115 may bear up against the wedge rod 130 in an inclined manner. As shown in FIG. 10, because the conventional wedge 115 includes chamfered surfaces 192 and 194, which include relatively sharp corners, damage may occur in either the wedge rod 130 or the conventional wedge 115 in the event the bearing load between the wedge rod 130 and the conventional wedge 115 is relatively high. However, in example embodiments, stress between a wedge rod 130 and the main wedge 200 according to example embodiments may be lower since the main wedge 200 according to example embodiments includes smooth filleted surfaces 305 and 325 rather than chamfered surfaces 160 and 165 that include the relatively sharp corners.

FIGS. 7-10 show an improved main wedge 200 that may be used with a conventional restrainer bracket. The main wedge 200 offers significant advantages over the conventional art at least by virtue of having filleted surfaces 305 and 325 rather than chamfered surfaces 192 and 194. However, example embodiments are not limited to the main wedge of FIGS. 7-10.

Figure 11:
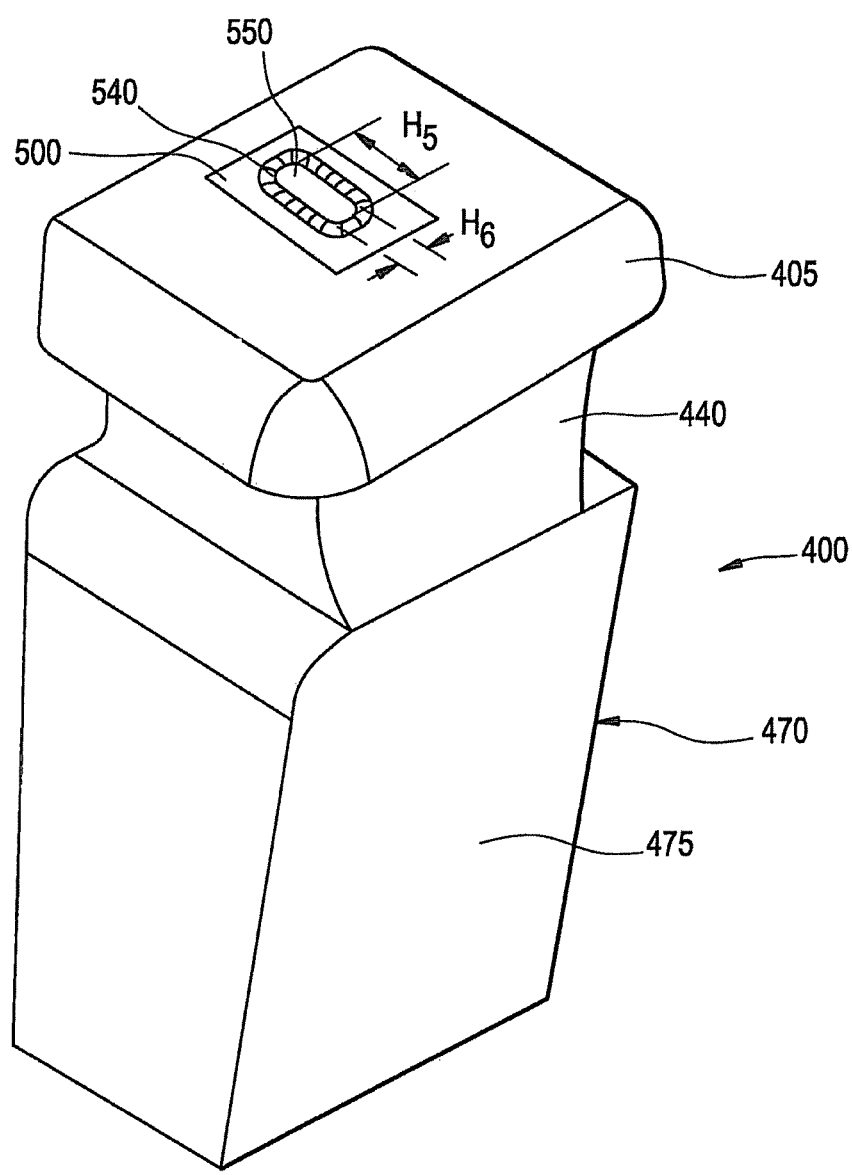
FIG. 11 is a view of a main wedge according to example embodiments.

FIG. 11 illustrates a main wedge 400 according example embodiments that may be used in a conventional restrainer bracket, for example, the restrainer bracket 100 illustrated in FIG. 2. The main wedge 400 according to example embodiments may include a head 405, a neck 440, and a body 470. The head 405 may resemble a flat plate having rounded edges and/or corners. However, example embodiments are not limited thereto as the head 405 may have relatively sharp edges and/or corners. The body 470 may resemble a wedge having an inclined surface 475. The inclined surface 475 may be configured to contact a restrainer bracket pad 145 of a yolk member 105. Holes 550, 551 and 552 may penetrate the head 405, the neck 440 and the body 470. The external dimensions of the head 405, the neck 440, and the body 470 of the main wedge 400 according to example embodiments may be substantially similar to the dimensions of the head 150, the neck 155 and the body 160 of the conventional main wedge 115. However, the internal structure of the main wedge 400 according to example embodiments is significantly different from the internal structure of the conventional main wedge 115.

Figure 12:
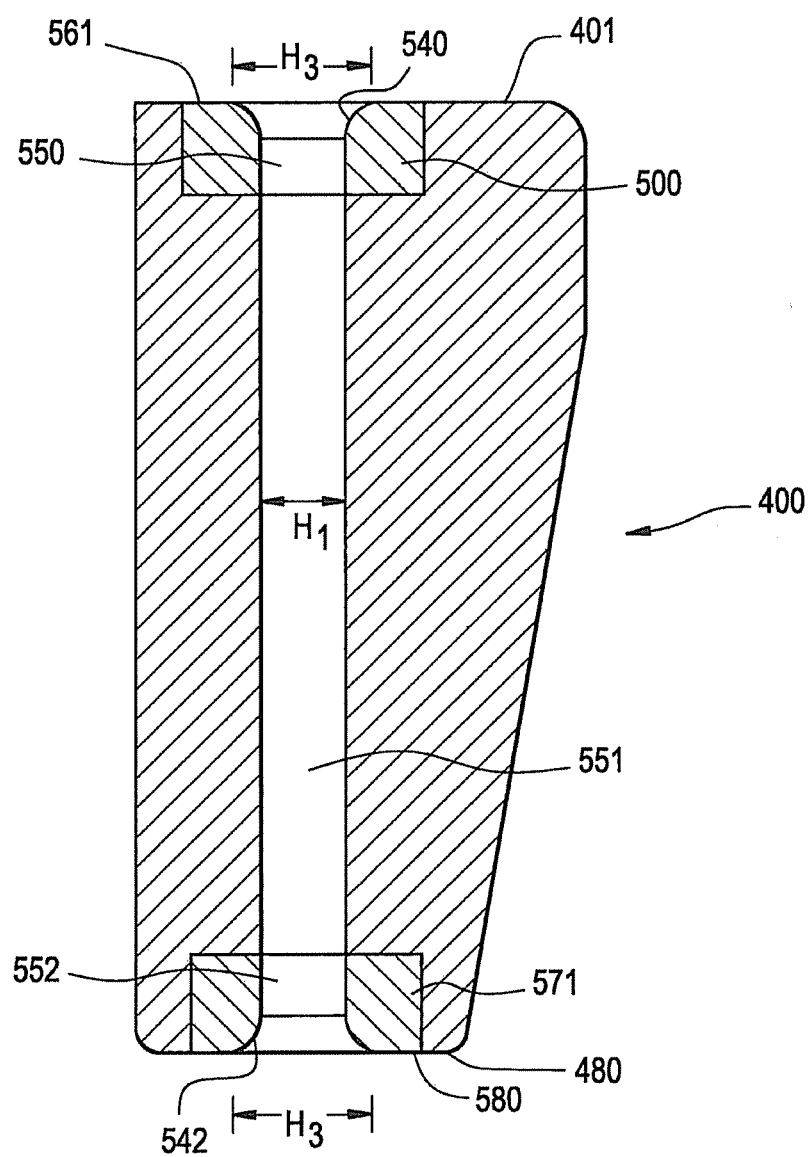
FIG. 12 is a section view of a main wedge according to example embodiments.

FIG. 12 is a section view of the main wedge 400. The main wedge 400 is similar to the main wedge 200 illustrated in FIGS. 7-10 except that the main wedge 400 includes inserts 500 and 571 at the head 405 and body 475, respectively. The inserts 500 and 571 provide curved surfaces 540 and 542 which are similar to the curved surfaces 305 and 325 of the main wedge 200. The inserts 500 and 571 also provide holes 550 and 552 that communicate with a hole 551 penetrating the head 405, the neck 440 and the main body 470. Thus, a wedge rod may easily pass through the holes 550, 551, and 552 provided in the first insert 500, the head 405, the neck 440, the body 470, and the second insert 571. In example embodiments the inserts 500 and 571 may be made of a material different from the material forming the head 405, the neck 440, and the body 470. For example, the material used for forming the inserts may be softer than the material used to form the forming the head 405, the neck 440, and the body 470. In particular, the material used for forming the inserts 500 and 571 may be made from 304 or 316 stainless steel and the head 405, the neck 440, and the body 470 may be made from X-750 stainless steel. Providing a softer steel for the inserts 500 and 571 may reduce stresses imparted to the wedge 400 or a wedge rod that may be inserted therein.

Figure 13:
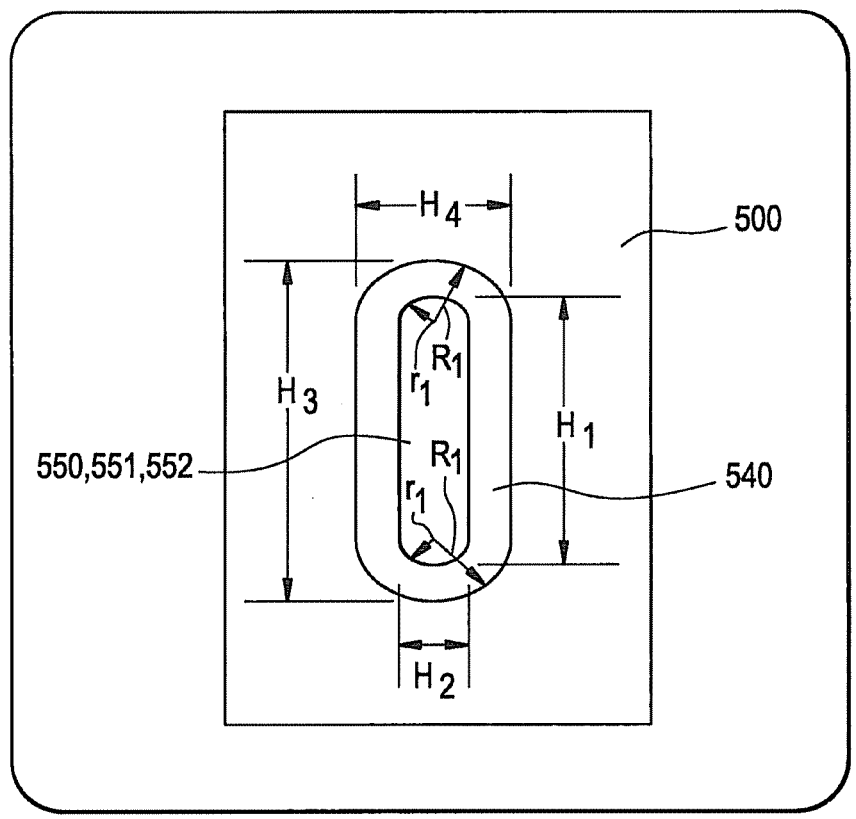
FIG. 13 is a top view of a main wedge according to example embodiments.

FIG. 13 is a plan view of the main wedge 400 which shows the holes 550, 551, and 552. As is obvious from FIG. 13, the holes 550, 551, and 552 penetrating the first insert 500, the head 405, the neck 440, the body 470, and the second insert 571 are slotted. This aspect of the wedge 400 departs from the conventional main wedge 115 in that the conventional main wedge 115 has a circular hole 190 rather than a slotted hole. As shown in FIG. 12, the slotted holes 550, 551 and 552 have a slot length of H1 and a slot height H2. In example embodiments, the slot length H1 is greater than the slot height H2. The ends of the slotted holes may be filleted to have a radius of r1. In example embodiments, the slot height H2 may be substantially equal to twice the fillet radius r1, however, example embodiments are not limited thereto as the slot height H2 may be larger than twice the fillet radius r1. In addition, the slot height H2 should be large enough to allow a wedge rod, for example, the wedge rod 130 of the conventional art, to pass therethrough thus allowing the main wedge 400 to freely slide on the wedge rod. Accordingly, the slot height H2 should be larger than the diameter of the wedge rod D1.

In the figures, the inserts 500 and 571 appear to have a slotted holes in rectangular inserts, however, the inserts need not be rectangular. For example, the inserts could be a polygonal or elliptical shape.

As previously mentioned, in the conventional art, a wedge rod 130 passes through a circular hole 190 formed in the conventional wedge 115. However, in example embodiments, because the holes 550, 551, and 552 are slotted, side clearances between a wedge rod passing through the main wedge 400 and the main wedge 400 may be reduced. For example, the slot height H2 of the main wedge 400 may be less than the diameter D2 of the circular hole passing through the conventional main wedge 115. Reducing the side clearances may reduce an amount of acceleration of the wedge 400 in the slot height H2 direction in the event the wedge 400 becomes excited and toggles back and forth. This mode of vibration may cause the wedge rod to wear. Therefore, reducing the acceleration of the wedge may reduce wedge rod wear.

Referring back to FIG. 12, slotted holes 550, 551, and 552 pass through the head 405, the neck, 440, and the body 470 of the main wedge 400. The head 405 includes a first surface 401 which is relatively flat. The first insert 500 includes a second surface 561 which is relatively flat and may be co-planer with the first surface 401 of the head 405. However, the first insert 500 also includes a third surface 540, which is a curved filleted surface that surrounds and defines the hole 550. The curved filleted surface 540 resembles a curved and slotted funnel. The top of the third surface 540 is incident with the second surface 561 of the first insert 500 and resembles a slotted circle having slot length H3 and a slot height H4. The bottom of the third surface 540 defines the hole 550 and thus likewise resembles a slotted hole. For example, the bottom of the third surface 540 resembles a slotted circle having a slot length of H1 and a slot height of H2.

The body 470 of the main wedge 400 includes a fourth surface 480 which is relatively flat. The second insert 571 includes a fifth surface 580 that may be coplanar with the fourth surface 480. However, the second insert 571 also includes a sixth surface 542, which is a curved filleted surface that surrounds and defines the hole 552. The sixth surface 542 resembles a slotted funnel. The bottom of the sixth surface 542 is incident with the fifth surface 580 of the second insert 571 and resembles a slotted circle that may have a slot length H3 and a slot height H4. The top of the sixth surface 542 defines the hole 552 and thus likewise resembles a slotted hole. For example, the top of the sixth surface 542 resembles a slotted circle that may have a slot length of H1 and a slot height of H2.

FIGS. 11-13 show an improved main wedge 400 that may be used with a conventional restrainer bracket. The main wedge 400 offers significant advantages over the conventional art at least by virtue of having filleted (or rounded) surfaces 540 and 542 rather than chamfered surfaces 192 and 194. In addition, because the filleted surfaces are formed in inserts 500 and 571, which may be made from a relatively soft material, stresses exerted on a wedge rod by the main wedge 400 may be reduced. However, example embodiments are not limited to the main wedges of FIGS. 7-10 and 11-13.

Figure 14:
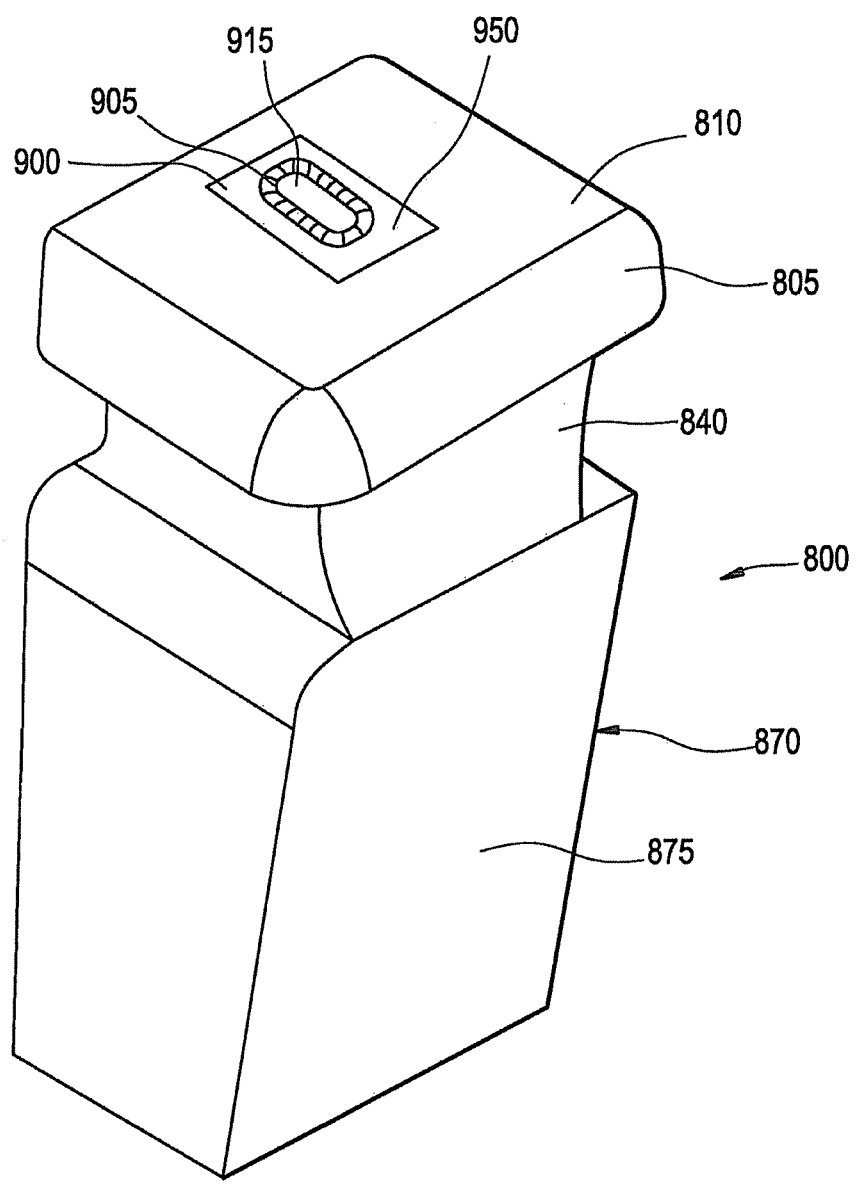
FIG. 14 is a view of a main wedge according to example embodiments.

FIG. 14 illustrates a main wedge 800 according example embodiments that may be used in a conventional restrainer bracket, for example, the restrainer bracket 100 illustrated in FIG. 2. The main wedge 800 according to example embodiments may include a head 805, a neck 840, and a body 870. The head 805 may resemble a flat plate having rounded corners. The body 870 may resemble a wedge having an inclined surface 875. The inclined surface 875 may be configured to contact a restrainer bracket pad 145 of a yolk member 105. A hole 915 may penetrate the head 805, the neck 840 and the body 870. The external dimensions of the head 805, the neck 840, and the body 870 of the main wedge 800 according to example embodiments may be substantially similar to the dimensions of the head 150, the neck 155 and the body 160 of the conventional main wedge 115. However, the internal structure of the main wedge 800 according to example embodiments is significantly different from the internal structure of the conventional main wedge 115.

Figure 15:
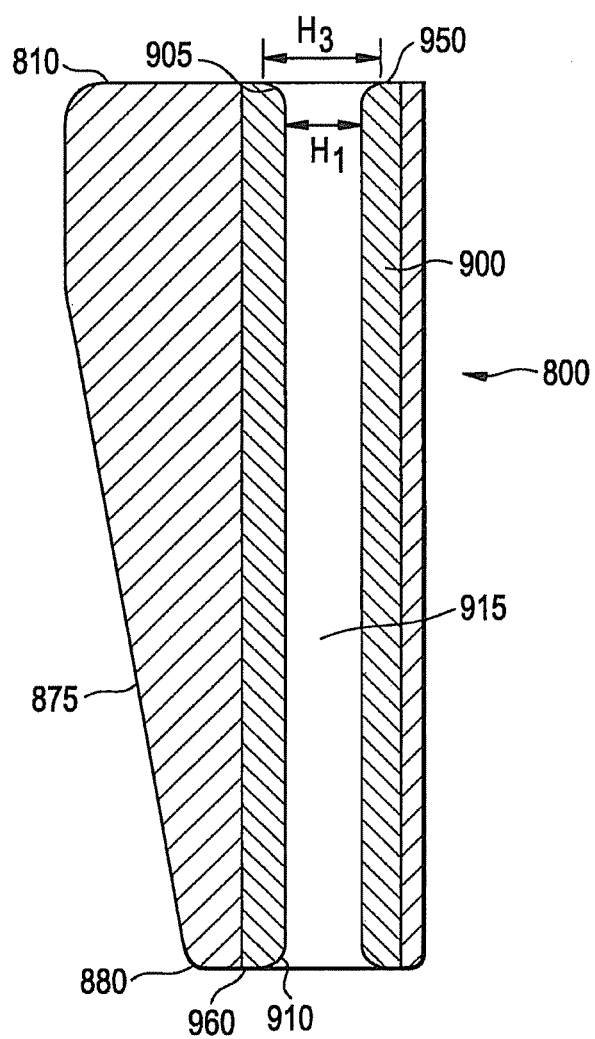
FIG. 15 is a section view of a main wedge according to example embodiments.

FIG. 15 is a section view of the main wedge 800. The main wedge 800 is similar to the main wedge 200 illustrated in FIGS. 7-10 except that the main wedge 800 includes an insert 900 penetrating the head 805, the neck 840, and body 870, respectively. The insert 900 may provide curved surfaces 905 and 910 which are similar to the curved surfaces 305 and 325 of the main wedge 200. The insert 900 also provides a slotted hole 915 penetrating the head 805, the neck 840 and the main body 870. In example embodiments the insert 900 may be made of a material different from the material forming the head 805, the neck 840, and the body 870. For example, the material used for forming the insert may be softer than the material used to form the head 805, the neck 840, and the body 870. In particular, the material used for forming the insert 900 may be made from 306 or 316 stainless steel and the head 805, the neck 840, and the body 870 may be made from X-750 stainless steel. Providing a softer steel for the insert 900 may reduce stresses imparted to the wedge 800 or a wedge rod that may be inserted therein.

Figure 16:
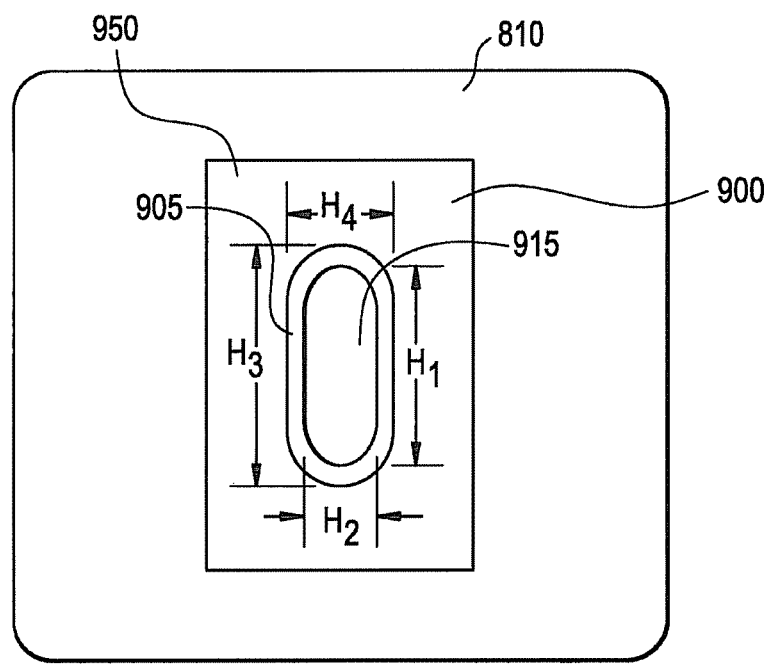
FIG. 16 is a top view of a main wedge according to example embodiments.

FIG. 16 is a plan view of the main wedge 800 which shows the hole 915. As is obvious from FIG. 16, the hole 915 penetrating the insert 900 is slotted. This aspect of the wedge 800 departs from the conventional main wedge 115 in that the conventional main wedge 115 has a circular hole 190 rather than a slotted hole. As shown in FIG. 16, the slotted hole 915 has a slot length of H1 and a slot height H2. In example embodiments, the slot length H1 is greater than the slot height H2. The ends of the slotted holes may be filleted to have a radius of r1. In example embodiments, the slot height H2 may be substantially equal to twice the fillet radius r1, however, example embodiments are not limited thereto as the slot height H2 may be larger than twice the fillet radius r1. In addition, the slot height H2 should be large enough to allow a wedge rod, for example, the wedge rod 130 of the conventional art, to pass therethrough thus allowing the main wedge 400 to freely slide on the wedge rod. Accordingly, the slot height H2 should be larger than the diameter of the wedge rod D1.

As previously mentioned, in the conventional art, a wedge rod 130 passes through a circular hole 190 formed in the conventional wedge 115. However, in example embodiments, because the hole is slotted, side clearances between a wedge rod passing through the main wedge 800 and the main wedge 800 may be reduced. For example, the slot height H2 may be less than the diameter D2 of the circular hole passing through the conventional main wedge 115. Reducing the side clearances may reduce an amount of acceleration of the wedge 800 in the slot height H2 direction in the event the wedge 800 becomes excited and toggles back and forth. This mode of vibration may cause the wedge rod to wear. Therefore, reducing the acceleration of the wedge may reduce wedge rod wear.

In the figures, the insert 900 appears to have a slotted hole in a rectangular inserts, however, the insert need not be rectangular. For example, the insert could have a polygonal or elliptical shape.

Referring back to FIG. 15, the slotted hole 915 passes through the insert 900 of the main wedge 800. The head 805 includes a first surface 810 which is relatively flat. The insert 900 includes a second surface 950 which is relatively flat and may be co-planer with the first surface 810 of the head 805. However, the insert 900 also includes a third surface 905, which is a curved filleted surface that surrounds and defines the hole 915. The curved filleted surface 905 resembles a curved and slotted funnel. The top of the third surface 905 is incident with the second surface 950 of the first insert 500 and resembles a slotted circle having slot length H3 and a slot height H4. The bottom of the third surface 905 defines the hole 915 and thus likewise resembles a slotted hole. For example, the bottom of the third surface 905 resembles a slotted circle having a slot length of H1 and a slot height of H2.

The body 870 of the main wedge 800 includes a fourth surface 880 which is relatively flat. The insert 900 includes a fifth surface 960 that may be coplanar with the fourth surface 880. However, the insert 900 also includes a sixth surface 910, which is a curved filleted surface that surrounds and defines the hole 915. The sixth surface 910 resembles a slotted funnel. The bottom of the sixth surface 910 is incident with the fifth surface 960 of the insert 900 and resembles a slotted circle having slot length H3 and a slot height H4. The top of the sixth surface 910 defines the hole 915 and thus likewise resembles a slotted hole. For example, the top of the sixth surface 910 resembles a slotted circle having a slot length of H1 and a slot height of H2.

Figure 17A:
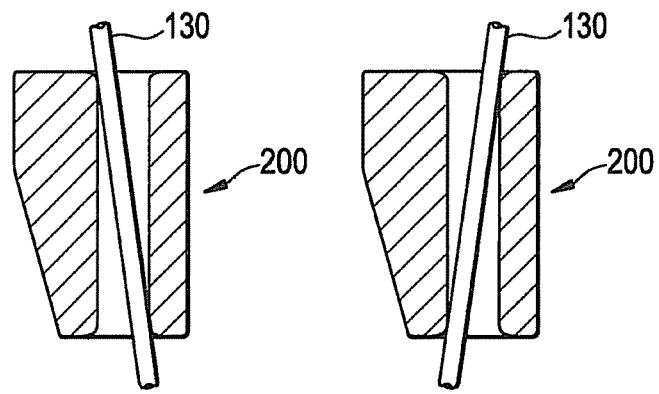
FIG. 17 are view of main wedges with wedge rods according to example embodiments.
Figure 17B:
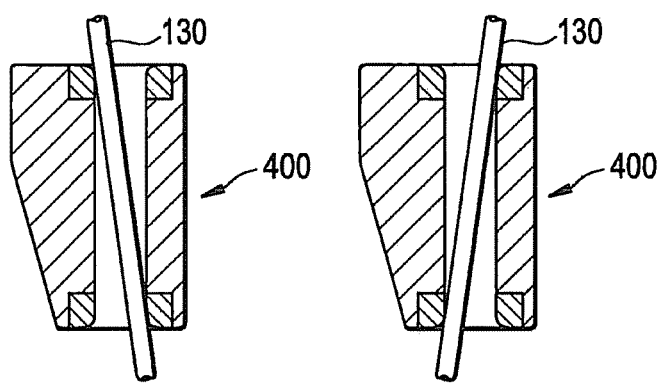
Figure 17C:
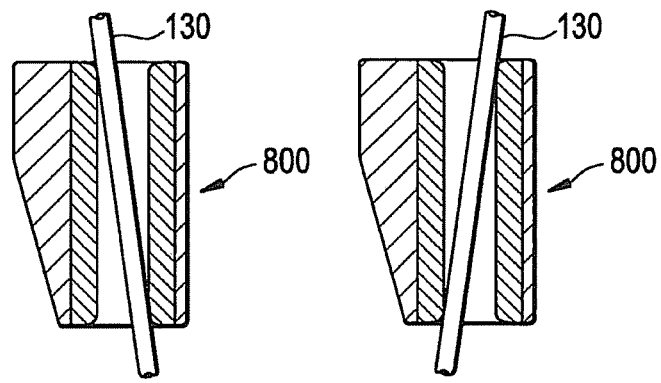

In each of the wedges 200, 400, and 800, the holes allowing a wedge rod to pass therethrough are slotted. Because the holes are slotted, side clearances may be reduced. However, the wedges 200, 400, and 800 may still toggle along a length of the slot. FIG. 17, for example, shows section views of the wedges 200, 400, and 800 with a wedge rod 130 passing therethrough. FIG. 17(a) for example, shows two views of the wedge 200 with the wedge rod 130 passing therethrough. The left figure of FIG. 17(a) shows the wedge rod 130 tilted to the left whereas the right figure shows the wedge rod 130 tilted to the right. Similarly, FIG. 17(b) shows two views of the wedge 400 with the wedge rod 130 passing therethrough. The left figure of FIG. 17(b) shows the wedge rod 130 tilted to the left whereas the right figure shows the wedge rod 130 tilted to the right. Similarly, FIG. 17(c) shows two views of the wedge 800 with the wedge rod 130 passing therethrough. The left figure of FIG. 17(c) shows the wedge rod 130 tilted to the left whereas the right figure shows the wedge rod 130 tilted to the right.

Although the wedges 200, 400, and 800 illustrated in FIGS. 17A, 17B, and 17C show the slotted hole as extending from a front of the wedges 200, 400, and 800 to a back of the wedges 200, 400, and 800, example embodiments are not limited thereto. The engineered slotted hole profiles may extend from the side of the wedges 200, 400, and 800 to the opposing side of the wedges 200, 400, and 800, as if FIGS. 17A, 17B, and 17C were sectioned at 90 degrees relative to the illustrated orientation. Although side clearances between a wedge rod and a wedge may be reduced, toggling in a direction orthogonal to the slotted hole length is not eliminated. However, because the engineered hole of example embodiments includes a curved surface, stresses developing between a wedge rod and wedge according to example embodiments due to the latter mode of toggling may be reduced.

FIG. 18 is another example of a wedge 200' that may be used in the conventional restrainer bracket assembly 100. Wedge 200' may be substantially identical to the earlier described wedge 200 with the exception that the wedge 200' includes a biasing mechanism 1000. As shown in FIG. 18, the biasing mechanism may be a ball and plunger type biasing mechanism having a body 1020 rigidly attached to the wedge 200' and a contact member 1010 configured to contact the wedge rod 130. The contact member 1010 may be configured to move towards and away from the body 1020. Addition of the biasing mechanism 1000 may prevent the wedge 200' from toggling with respect to the wedge rod 130 thus reducing or preventing damage to the wedge rod 130. Although the biasing mechanism 1000 has been illustrated as a ball and plunger type mechanism, example embodiments are not limited thereto. For example, biasing mechanism could alternatively be a leaf spring, a coil spring, or a Belleville washer.

Figure 19:
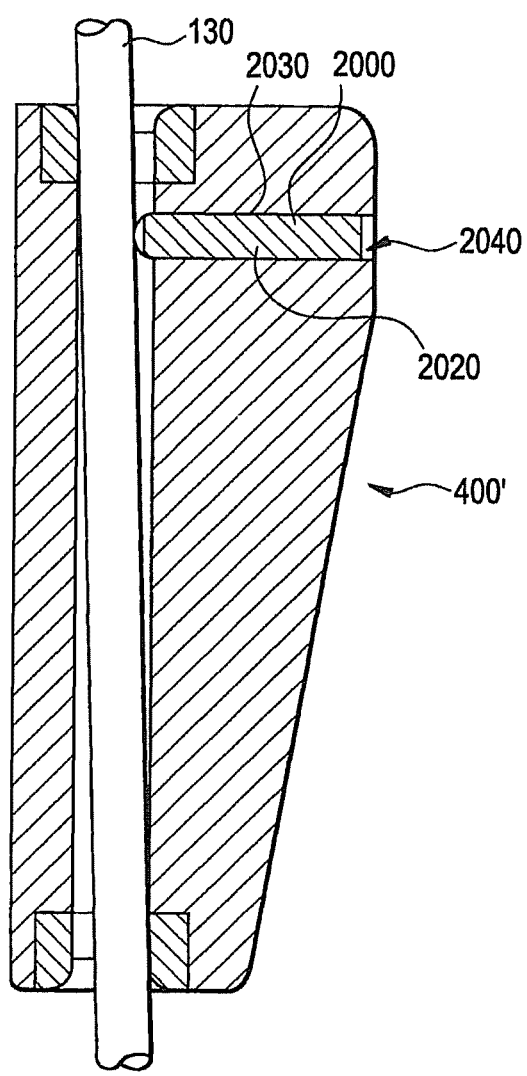
FIG. 19 is a section view of a main wedge according to example embodiments.

In example embodiments, the wedge 200' may include a hole 1030 through which the biasing mechanism 1000 may be inserted. The hole 1030, for example, may be provided in the head of the wedge 200', however, example embodiments are not limited thereto. For example, the hole 1030 may be provided in either the neck or the body of the wedge 200'. In example embodiments, the biasing mechanism 1000 may be press fit into the wedge 200' such the biasing mechanism 1000 may be securely retained in the hole. The biasing mechanism 1000, may be additionally restrained in the hole via spot welding. In FIG. 19, a spot weld 1040 may be provided to secure the biasing mechanism to the wedge 200'.

FIG. 19 is another example of a wedge 400' that may be used in the conventional restrainer bracket assembly 100. Wedge 400' may be substantially identical to the earlier described wedge 400 with the exception that the wedge 400' includes a biasing mechanism 2000. As shown in FIG. 19, the biasing mechanism 2000 may be a ball and plunger type biasing mechanism having a body 2020 rigidly attached to the wedge 400' and a contact member 2010 configured to contact the wedge rod 130. The contact member 2010 may be configured to move towards and/or away from the body 2020. Addition of the biasing mechanism 2000 may prevent the wedge 400' from toggling with respect to the wedge rod 130 thus reducing or preventing damage to the wedge rod 130. Although the biasing mechanism 2000 has been illustrated as a ball and plunger type mechanism, example embodiments are not limited thereto. For example, biasing mechanism could alternatively be a leaf spring, a coil spring, or a Belleville washer.

In example embodiments, the wedge 400' may include a hole 2030 through which the biasing mechanism 2000 may be inserted. The hole 2030, for example, may be provided in the head of the wedge 400', however, example embodiments are not limited thereto. For example, the hole may be provided in either the neck or the body of the wedge 400'. In the example embodiments, the biasing mechanism 2000 may be pressed fit into the wedge 400' such the biasing mechanism 2000 may securely retained in the hole. The biasing mechanism 2000, may be additionally restrained in the hole via spot welding, In FIG. 19, a spot weld 2040 may be provided to secure the biasing mechanism to the wedge 400'.

In FIG. 19, the hole 2030 is shown as passing through the head of the wedge 400' below the upper insert, however, example embodiments are not limited thereto. For example, the hole 2030 may pass through both the head and the upper insert to contact the wedge rod 130. Similarly, if the hole 2030 were provided in the body of the wedge 400', the hole could be provided only in the body above the lower insert or passing through the body and the lower insert.

Figure 20:
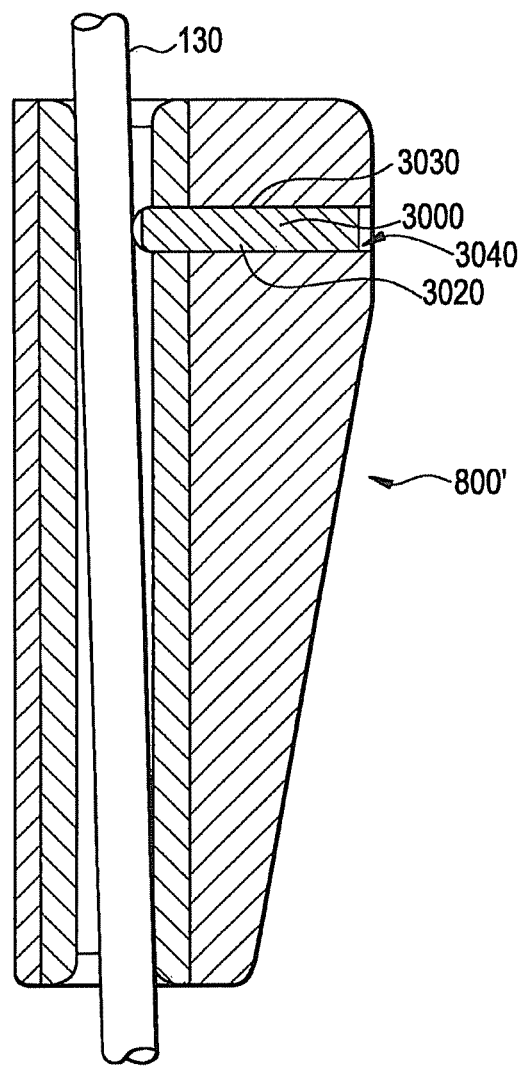
FIG. 20 is a view of a main wedge according to example embodiments.

FIG. 20 is another example of a wedge 800' that may be used in the conventional restrainer bracket assembly 100. Wedge 800' may be substantially identical to the earlier described wedge 800 with the exception that the wedge 800' includes a biasing mechanism 3000. As shown in FIG. 20, the biasing mechanism 3000 may be a ball and plunger type biasing mechanism having a body 3020 rigidly attached to the wedge 800' and a contact member 3010 configured to contact the wedge rod 130. The contact member 2010 may be configured to move towards and/or away from the wedge rod 130. Addition of the biasing mechanism 3000 may may prevent the wedge 800' from toggling with respect to the wedge rod 130 thus reducing or preventing damage to the wedge rod 130. Although the biasing mechanism 3000 has been illustrated as a ball and plunger type mechanism, example embodiments are not limited thereto. For example, biasing mechanism could alternatively be a leaf spring, a coil spring, or a belleville washer.

In example embodiments, the wedge 800' may include a hole 3030 through which the biasing mechanism 3000 may be inserted. The hole 3030, for example, may be provided in the head of the wedge 800', however, example embodiments are not limited thereto. For example, the hole may be provided in either the neck or the body of the wedge 800'. In example embodiments, the biasing mechanism 3000 may be press fit into the wedge 800' such the biasing mechanism 3000 may be securely retained in the hole. The biasing mechanism 3000, may be additionally restrained in the hole via spot welding. In FIG. 20, a spot weld 3040 may be provided to secure the biasing mechanism to the wedge 800'.

In FIG. 20, the hole 3030 is shown as passing through the head of the wedge 800' and through the insert, however, example embodiments are not limited thereto. For example, the hole 3030 may be provided in the body of the wedge 800' and may pass through both the body and the insert.

Although the biasing mechanisms 1000, 2000, and 3000 are shown as being mounted to the front sides of wedges 200', 400', and 800', the invention is not limited thereto. For example, the biasing mechanisms 1000, 2000, and 3000 may be mounted on the backs or sides of the wedges 200', 400', and 800'.

Figure 21:
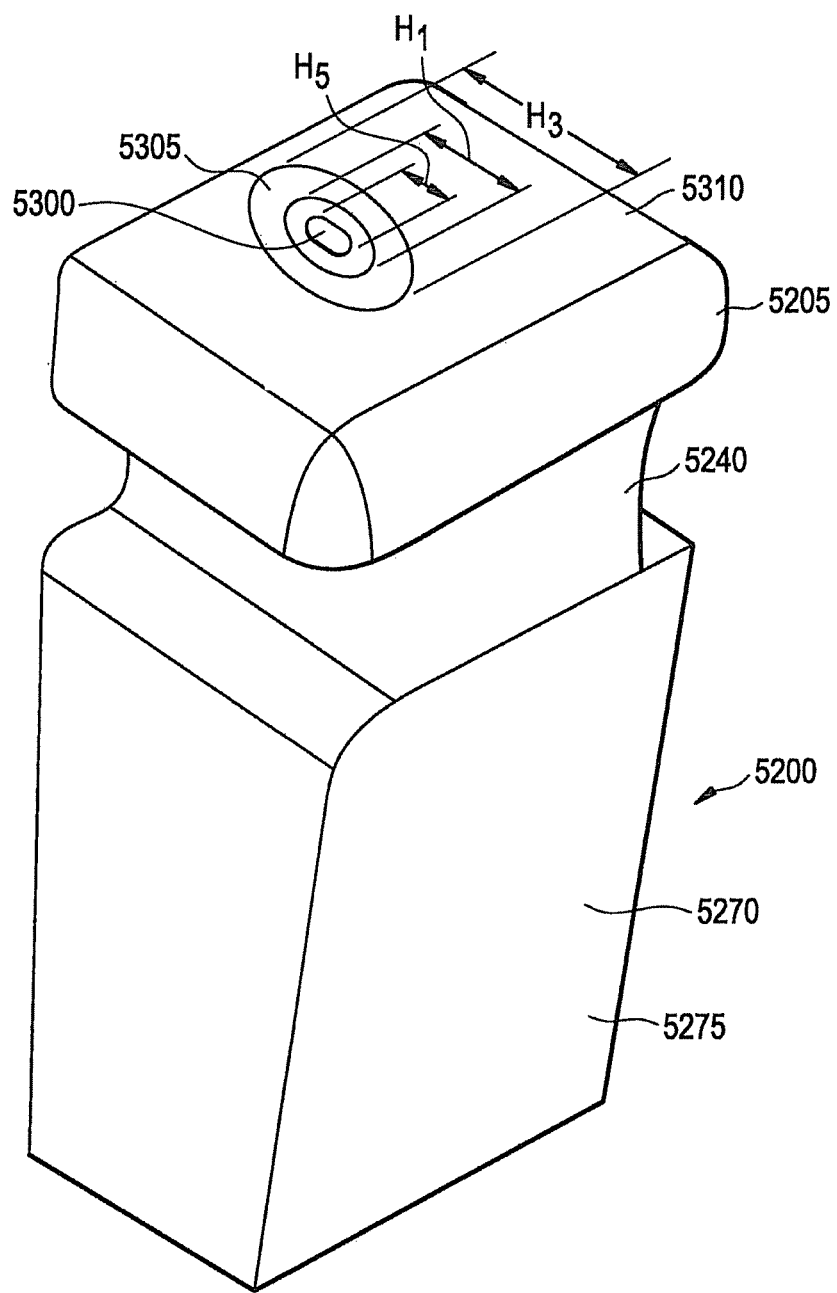
FIG. 21 is a view of a main wedge according to example embodiments.

FIG. 21 illustrates a main wedge 5200, according to another example embodiment, that may be used in a conventional restrainer bracket, for example, the restrainer bracket 100 illustrated in FIG. 2. The main wedge 5200 according to example embodiments may include a head 5205, a neck 5240, and a body 5270. The head 5205 may resemble a flat plate having rounded edges and/or corners. However, the head is not limited to the rounded edges and/or corners and may instead have relatively sharp edges and/or corners. The body 5270 may resemble a wedge having an inclined surface 5275. In example embodiments, the inclined surface 5275 may be configured to interface with a conventional restrainer bracket pad, for example, the restrainer bracket pad 145 of the conventional yolk member 105. A hole 5300 may penetrate the head 5205, the neck 5240 and the body 5270. The external dimensions of the head 5205, the neck 5240, and the body 5270 of the main wedge 5200 according to example embodiments may be substantially similar to the dimensions of the head 150, the neck 155 and the body 160 of the conventional main wedge 115. However, the internal structure of the main wedge 5200 according to example embodiments is significantly different from the internal structure of the conventional main wedge 115.

Figure 22:
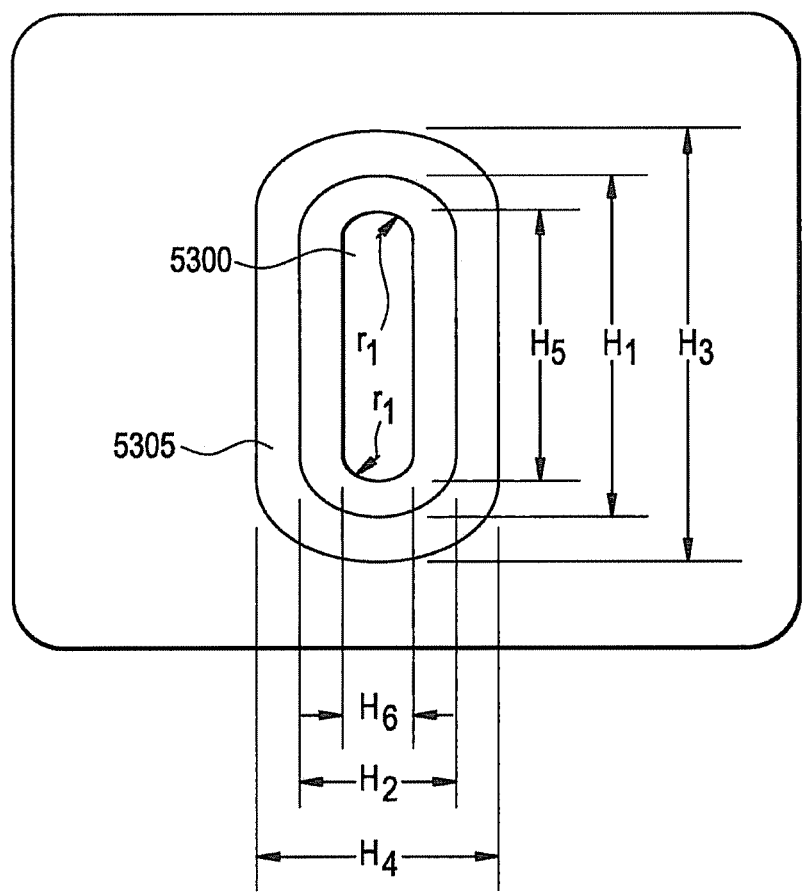
FIG. 22 is a top view of a main wedge according to example embodiments.

FIG. 22 is a plan view of the main wedge 5200, which shows the hole 5300. As is obvious from FIG. 22, the hole 5300 penetrating the main wedge 5200 is slotted. This aspect departs from the conventional main wedge 115 in that the conventional main wedge 115 has a circular hole 190 rather than a slotted hole. As shown in FIG. 22, the slotted hole 5300 has a slot length of H5 and a slot height H6. In example embodiments, the slot length H5 is greater than the slot height H6. The ends of the slotted holes may be filleted to have a radius of r1. In example embodiments, the slot height H6 may be substantially equal to twice the fillet radius r1, however, example embodiments are not limited thereto as the slot height H6 may be larger than twice the fillet radius r1. In addition, the slot height H6 should be large enough to allow a wedge rod to pass therethrough thus allowing the main wedge 5200 to freely slide on the wedge rod. For example, the slot height H6 should be larger than the diameter of the wedge rod D1.

As previously mentioned, in the conventional art, a wedge rod 130 passes through a circular hole 190 formed in the conventional wedge 115. However, in example embodiments, because the hole is slotted, side clearances between a wedge rod passing through the main wedge 5200 and the main wedge 5200 may be reduced. For example, the slot height H6 may be less than the diameter D2 of the circular hole 190 passing through the conventional main wedge 115. Reducing the side clearances may reduce an amount of acceleration of the wedge 5200 in the slot height H6 direction in the event the wedge 5200 becomes excited and toggles back and forth. This mode of vibration may cause the wedge rod to wear. Therefore, reducing the acceleration of the wedge may reduce wedge rod wear.

Figure 23:
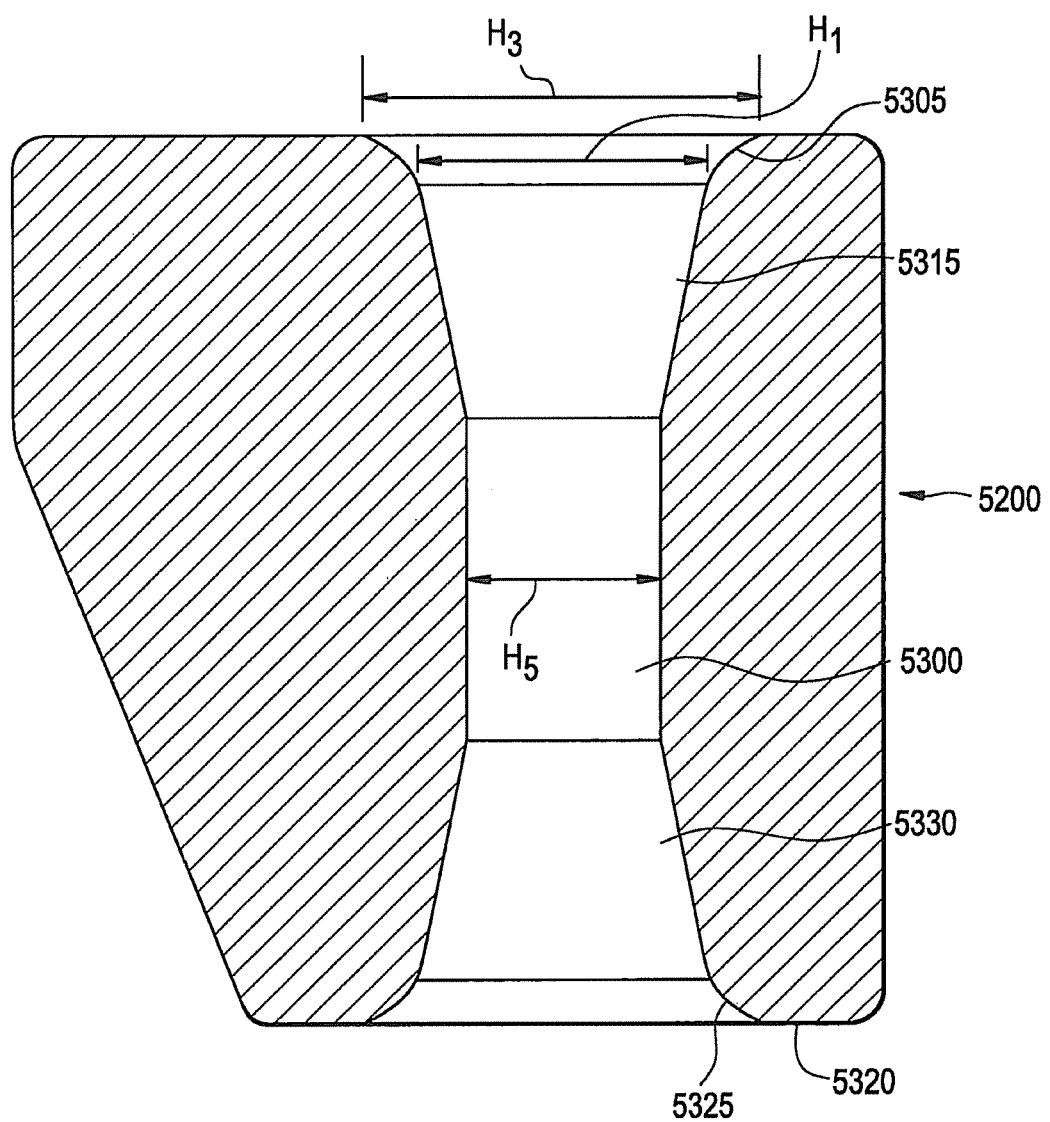
FIG. 23 is a section view of a main wedge according to example embodiments.

FIG. 23 is a cross-section of the main wedge 5200 according to example embodiments. As shown in FIG. 23, the slotted hole 5300 passes through the head 5205, the neck, 5240, and the body 5270 of the main wedge 5200. The head 5205 includes a first surface 5310 which is relatively flat. However, the head 5205 also includes a second surface 5305, which is a curved filleted surface. The curved filleted surface 5305 resembles a slotted funnel. The top of the second surface 5305 is incident with the first surface 5310 of the head 5205 and resembles a slotted circle having slot length H3 and a slot height H4 (see FIG. 22). The bottom of the second surface 5305 resembles a slotted circle having a slot height of H2 and a slot length of H1. In example embodiments H3>H1 and H4>H2. The bottom of the second surface 5305 transitions into a third surface 5315 which is a chamfered surface having relatively straight inclined portions. The top of the third surface 5315 resembles a slotted circle having a slot height of H1 and a slot length of H2 and a bottom of the third surface 5315 defines the hole 5300 and thus likewise resembles a slotted hole. For example, the bottom of the third surface 5315 resembles a slotted circle having a slot length of H5 and a slot height of H6.

The body 5270 of the main wedge 5200 includes a fourth surface 5320 which is relatively flat. However, the body 5270 also includes a fifth surface 5325, which is a curved filleted surface. The fifth surface 5325 resembles a slotted funnel. The bottom of the fifth surface 5325 is incident with the fourth surface 5320 of the body 5270 and resembles a slotted circle that may have a slot length H3 and a slot height H4, however, example embodiments are not limited thereto. The top of the fifth surface 5325 resembles a slotted hole having a slot height of H2 and a slot length of H1. The top of the fifth surface 5325 resembles a slotted circle having a slot length of H1 and a slot height of H2. The top of the fifth surface 5325 transitions into a sixth surface 5330 which is a chamfered surface having relatively straight inclined portions. The bottom of the sixth surface 5330 resembles a slotted circle having a slot height of H2 and a slot length of H1 and a top of the sixth surface 5330 defines the hole 5300 and thus likewise resembles a slotted hole. For example, the top of the sixth surface 5330 resembles a slotted circle having a slot length of H5 and a slot height of H6.

Figure 24:
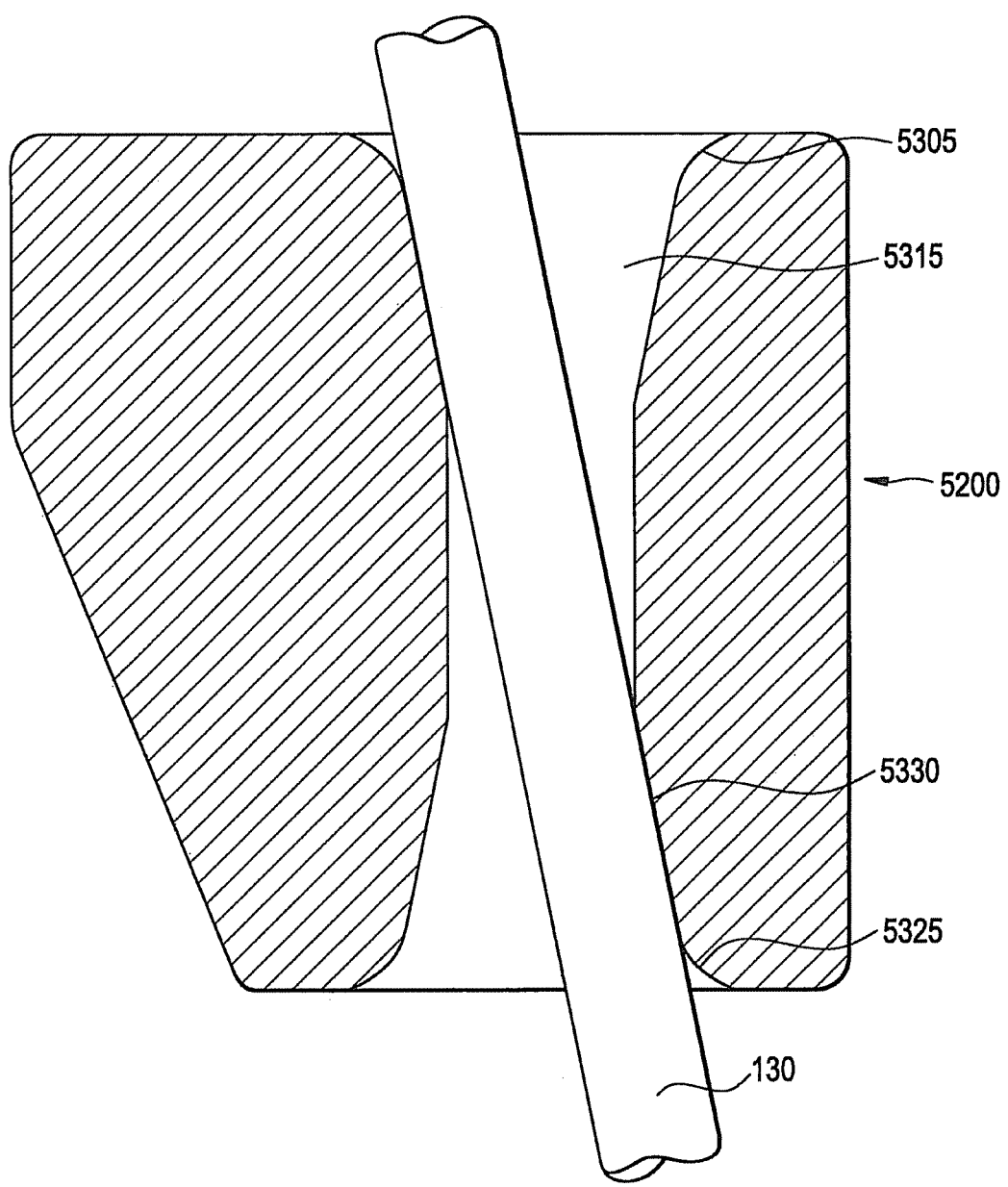
FIG. 24 is a section view of a main wedge and with a wedge rod therein according to example embodiments.

FIG. 24 illustrates the main wedge 5200 according to example embodiments with a conventional wedge rod 130 inserted therein. In the conventional art, the conventional wedge 115 may bear up against the wedge rod 130 in an inclined manner. As shown in FIG. 10, because the conventional wedge 115 includes chamfered surfaces 192 and 194, which include relatively sharp corners, damage may occur in either the wedge rod 130 or the conventional wedge 115 in the event the bearing load between the wedge rod 130 and the conventional wedge 115 is relatively high. However, in example embodiments, stress between a wedge rod 130 and the main wedge 5200 according to example embodiments may be lower since the main wedge 5200 according to example embodiments includes chamfered surfaces 5315 and 5330 which are configured to cause a line contact between the wedge rod 130 and the wedge 5200 rather than a point contact as in the conventional art. Accordingly, the chamfered surfaces 5315 and 5330 may reduce damage to either a conventional rod 130 or the wedge 5200.

Figure 25:
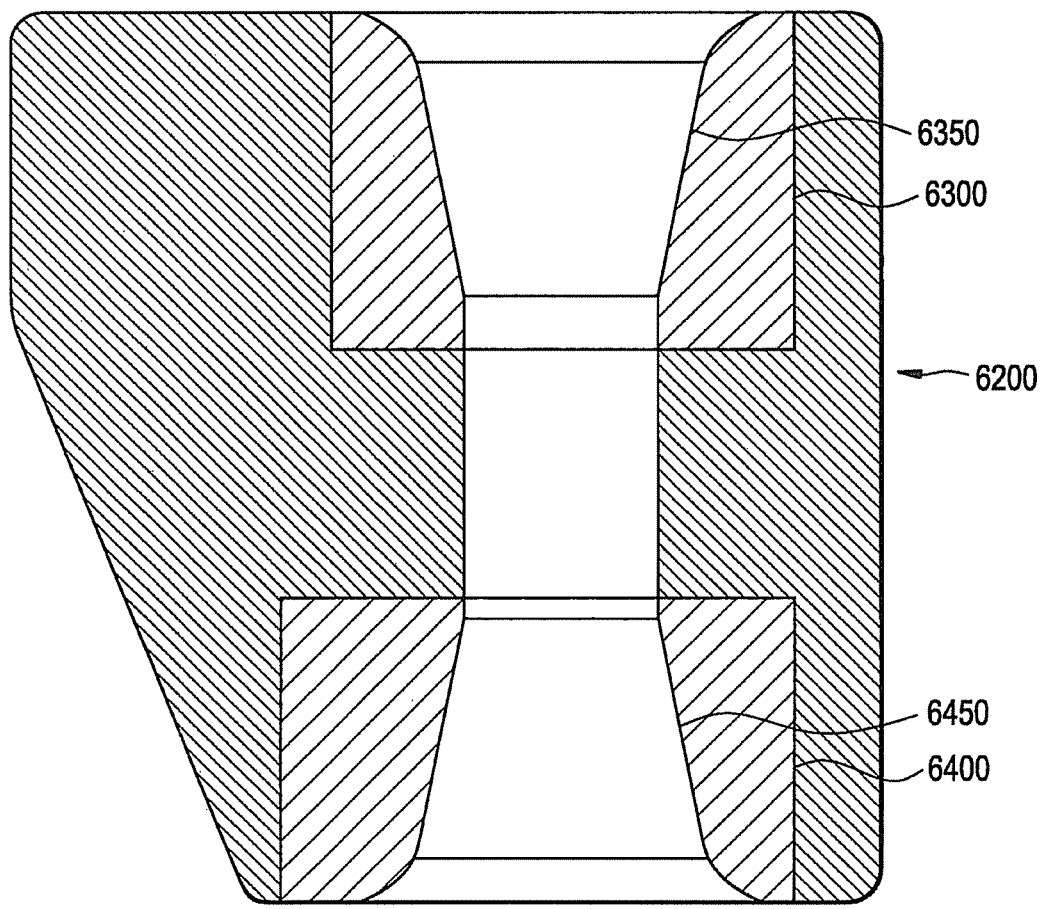
FIG. 25 is a section view of a main wedge according to example embodiments.
Figure 26:
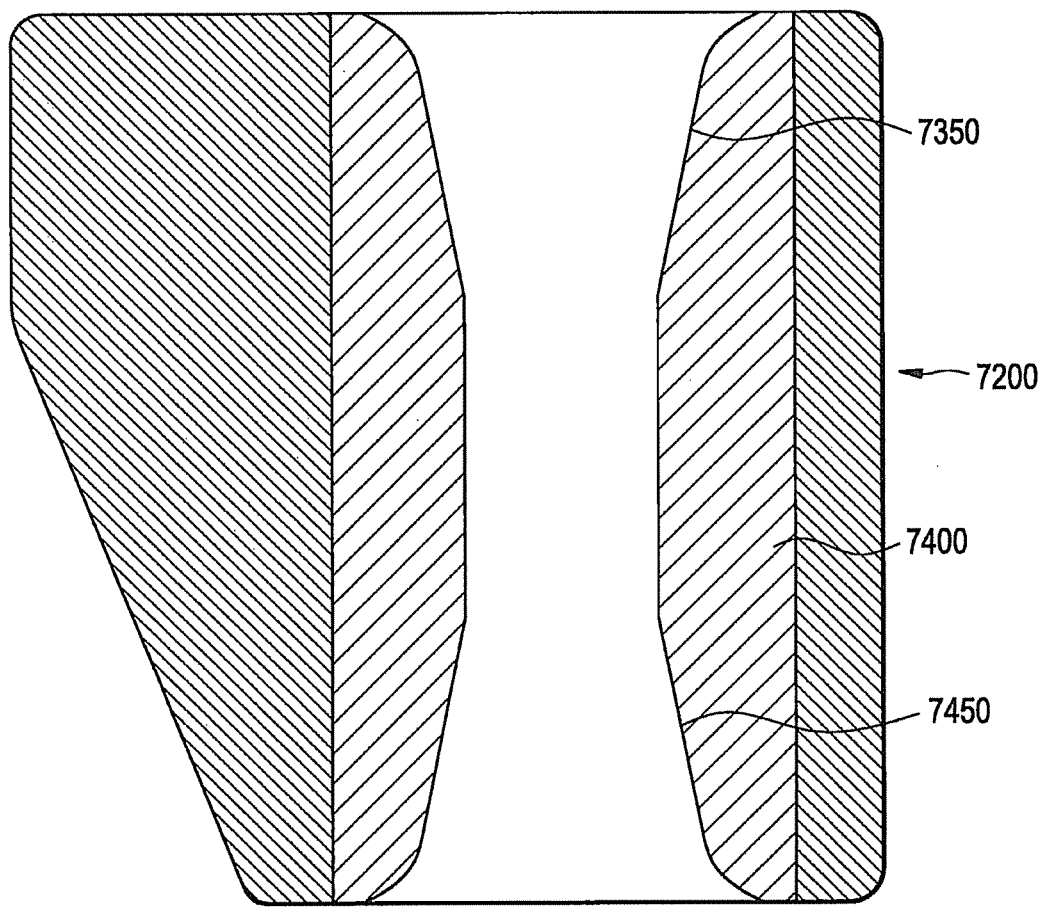
FIG. 26 is a section view of a main wedge according to example embodiments.

In FIGS. 21-24 the chamfered surfaces 5315 and 5330 are formed directly in the wedge 5200. However, example embodiments are not limited thereto. For example, the chamfered surfaces could be provided in the inserts that may be inserted into the wedge. For example, FIGS. 25 and 26 illustrate example embodiments of wedges having inserts that provide chamfered surfaces similar to the chamfered surfaces 5315 and 5330 of wedge 5200. For example, FIG. 25 illustrates and example wedge 6200 having two inserts 6300 and 6400 at the bottom and top of the wedge 6200. In this example embodiment, the top insert 6300 includes a chamfered surface 6350 similar to the chamfered surface 5315 of wedge 5200 and the bottom insert 6400 includes a chamfered surface 6450 similar to the surface 5330 of the wedge 5200. As another example, FIG. 26 illustrates an example wedge 7200 having a single insert 7400 extending through the wedge 7200. In this example embodiment, the insert 7400 includes a chamfered surface 7350 similar to the chamfered surface 5315 of wedge 5200 and a chamfered surface 7450 similar to the surface 5330 of the wedge 5200. As in the earlier described example embodiments, the material used in forming the inserts 6300, 6400, and 7400 may be softer than the material forming the head, neck and body of the wedges 6200 and 7200. For example, the inserts 6300, 6400, and 7400 may be made from 304 or 316 stainless steel and the head, the neck, and the body of the wedges 6200 and 7200 may be made from X-750.

Although the wedges 5200, 6200, and 7200 illustrated in FIGS. 23-26 show the slotted hole having chamfered surfaces 5315, 6350, and 7350 as extending from a front of the wedges 5200, 6200, and 7200 to a back of the wedges 5200, 6200, and 7200, example embodiments are not limited thereto. The engineered slotted hole profiles may extend from the side of the wedges 5200, 6200, and 7200 to the opposing side of the wedges 5200, 6200, and 7200, as if FIGS. 23-26 were sectioned at 90 degrees relative to the illustrated orientation.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed:

1. A wedge comprising:
a head including a first surface, the first surface being substantially flat, the first surface enclosing a first slotted hole having a first length and a first height differing from the first length, the first slotted hole engaging a second surface, the second surface being a curved, chamfered surface extending below the first surface and terminating in a second slotted hole having a second length and a second height differing from the second length;
a neck arranged below and connected to the head; and a body arranged below and connected to the neck, the body including an inclined surface and a third surface, the third surface being substantially flat, the third surface enclosing a third slotted hole having a third length and a third height differing from the third length, the third slotted hole engaging a fourth surface, the fourth surface being a curved chamfered surface extending above the third surface and terminating in a fourth slotted hole having the second length and the second height, the second slotted hole extending through the head, the neck, and the body and terminating at the fourth slotted hole.

2. The wedge of claim 1, wherein
the head includes a first insert and the first surface is a top surface of the first insert and the second surface extends through the first insert, and
the body includes a second insert and the third surface is a bottom surface of the second insert and the fourth surface extends through the second insert.

3. The wedge of claim 2, wherein the material forming the first and second inserts is softer than the material forming at least one of the head and the body.

4. The wedge of claim 3 wherein the material forming the first and second inserts includes at least one of 304 and 316 stainless steel and the material forming the head and the body includes X-750 stainless steel.

5. The wedge of claim 2 further comprising:
a biasing member penetrating the head, neck or body, and arranged below the first insert.

6. The wedge of claim 5, wherein the biasing member is configured to engage a wedge rod.

7. The wedge of claim 2, wherein the first and second inserts include sloped, tapered surfaces configured to provide a line contact with a wedge rod passing through the wedge.

8. The wedge of claim 1, further comprising:
an insert passing through the head, the neck, and the body, the insert including a top surface coplanar with the first surface and a bottom surface coplanar with the third surface, wherein the second surface and the fourth surface are formed in the insert.

9. The wedge of claim 8, wherein the material forming the insert is softer than the material forming at least one of the head and the body.

10. The wedge of claim 9 wherein the material forming the insert includes at least one of 304 and 316 stainless steel and the material forming the head and the body includes X-750 stainless steel.

11. The wedge of claim 8 further comprising:
a biasing member penetrating the head, neck or body, and the insert.

12. The wedge of claim 11, wherein the biasing member is configured to engage a wedge rod.

13. The wedge of claim 8, wherein the insert includes fifth and sixth surfaces configured to provide a line contact with a wedge rod passing through the wedge.

* * * * *